(12) United States Patent
Kishi et al.

(10) Patent No.: US 7,624,288 B2
(45) Date of Patent: Nov. 24, 2009

(54) SYSTEM FOR CONTROLLING POWER SUPPLIES OF AN IMAGE FORMATION APPARATUS

(75) Inventors: Kazuhito Kishi, Kanagawa (JP); Naoki Sato, Kanagawa (JP); Yoshihisa Kimura, Kanagawa (JP); Tetsuya Yano, Kanagawa (JP); Norio Muraishi, Tokyo (JP); Toshitaka Semma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 531 days.

(21) Appl. No.: 11/609,467

(22) Filed: Dec. 12, 2006

(65) Prior Publication Data
US 2007/0201894 A1 Aug. 30, 2007

(30) Foreign Application Priority Data
Dec. 19, 2005 (JP) ............................. 2005-365086

(51) Int. Cl.
*G06F 1/26* (2006.01)
(52) U.S. Cl. ................... 713/300; 713/330; 713/340; 358/1.14; 358/475; 399/69; 399/88
(58) Field of Classification Search ................ 713/300, 713/330, 340; 358/1.14, 475; 399/69, 88
See application file for complete search history.

(56) References Cited

U.S. PATENT DOCUMENTS

| | | | |
|---|---|---|---|
| 6,239,884 B1 * | 5/2001 | Yamamoto ................. 358/475 |
| 6,542,705 B2 * | 4/2003 | Fujita et al. .................. 399/69 |
| 7,002,112 B2 | 2/2006 | Kishi et al. |
| 7,010,255 B2 | 3/2006 | Yura et al. |
| 7,054,570 B2 | 5/2006 | Kishi et al. |
| 7,116,923 B2 | 10/2006 | Kishi et al. |
| 7,130,555 B2 | 10/2006 | Kishi et al. |
| 7,190,472 B2 * | 3/2007 | Watanabe ................. 358/1.14 |
| 2004/0007991 A1 * | 1/2004 | Ryu et al. .................... 315/291 |
| 2004/0245235 A1 | 12/2004 | Kishi et al. |
| 2004/0245241 A1 | 12/2004 | Kishi et al. |
| 2005/0123315 A1 | 6/2005 | Kishi et al. |
| 2005/0139584 A1 | 6/2005 | Kishi et al. |
| 2005/0175368 A1 | 8/2005 | Matsusaka et al. |
| 2005/0175370 A1 | 8/2005 | Matsusaka et al. |
| 2005/0191078 A1 | 9/2005 | Kishi et al. |
| 2006/0039713 A1 | 2/2006 | Kishi et al. |
| 2006/0051111 A1 | 3/2006 | Kishi et al. |
| 2006/0051112 A1 | 3/2006 | Matsusaka et al. |
| 2006/0051113 A1 | 3/2006 | Kishi et al. |

(Continued)

FOREIGN PATENT DOCUMENTS

JP 10-282821 10/1998

(Continued)

*Primary Examiner*—Thuan N Du
(74) *Attorney, Agent, or Firm*—Oblon, Spivak, McClelland, Maier & Neustadt, L.L.P.

(57) ABSTRACT

An image formation apparatus is disclosed. The image formation apparatus includes a manuscript reading unit for reading a manuscript, a main power supply for supplying electric power to an alternating-current load and a direct-current load, and an auxiliary power supply that is capable of storing electric power for supplying electric power to the direct-current load. Power supply to the direct-current load is switched between the main power supply and the auxiliary power supply when reading the manuscript is not being carried out.

7 Claims, 18 Drawing Sheets

U.S. PATENT DOCUMENTS

| | | |
|---|---|---|
| 2006/0051119 A1 | 3/2006 | Kishi et al. |
| 2006/0051120 A1 | 3/2006 | Kishi et al. |
| 2006/0051121 A1 | 3/2006 | Matsusaka et al. |
| 2006/0127118 A1 | 6/2006 | Kishi et al. |
| 2006/0237446 A1 | 10/2006 | Kishi et al. |

FOREIGN PATENT DOCUMENTS

| | | |
|---|---|---|
| JP | 2000-315567 | 11/2000 |

* cited by examiner

ROLLER AXIS DIRECTIONS

SYSTEM FOR CONTROLLING POWER SUPPLIES OF AN IMAGE FORMATION APPARATUS

BACKGROUND OF THE INVENTION

1. Field of the Invention

The present invention generally relates to an image formation apparatus that includes an auxiliary power supply, and especially relates to an image formation apparatus such as a copying machine and a printer based on electronic photography, which image formation apparatus uses a power equalization control technique so that a great amount of power is made available without exceeding the maximum capacity from a commercial power line by providing power from the auxiliary power supply to a direct-current load (DC load).

2. Description of the Related Art

As a fixing unit 10 of the image formation apparatus based on the electronic photography, a heating roller method is often used in view of its high-speed operation and safety. According to the heating roller method, a printing medium P (such as paper) is inserted into a nip that is formed by a heating roller heated by a halogen heater and a countering roller. The countering roller is rotatable, arranged countering the heating roller, and pressed to the heating roller. In this way, the printing medium P is pressed and heated.

The heating roller is made of a metal, and made to have a great thermal capacity. For this reason, it takes a long time, which time ranges from several minutes to tens of minutes, before the temperature of the heating roller reaches a temperature required for a fixing operation. Such temperature is called "fixing temperature" and is about 180° C. For this reason, the temperature of the heating roller is maintained at a predetermined temperature during a standby period wherein no printing operations are carried out. That is, energy is consumed during the standby period so that the image formation apparatus can be immediately used.

In recent years and continuing, energy-saving regulations are enacted from the rise of environmental protection consciousness in countries worldwide. In Japan, the Rational Use of Energy Law is revised and reinforced; and in the US, energy-saving programs, such as Energy Star and ZESM (Zero Energy Star Mode), are enacted. In order to attain power savings in response to these regulations and programs, it is desired that the energy consumption during the standby period be reduced; or more preferably, that no standby power be required.

However, according to conventional fixing apparatuses, if the power is shut down during the standby period, it takes a long time before the heating roller becomes operational, causing inconvenience to users. For this reason, a device that is capable of promptly raising the heating roller temperature is needed so that an energy-saving copying machine, and the like, can be realized. In this connection, ZESM, for example, requires 10 seconds or less for re-starting from the standby period.

Then, the heating roller is made thin so that the temperature rising time can be shortened. Thin heating rollers have been widely used by image formation apparatuses of middle to low-speed. However, they are not adequate for high-speed machines with a printing speed of 60 cpm (copies per minute) or greater. The reason is that a great number of sheets pass the nip per unit time, and the temperature of the heating roller quickly falls due to the small heat capacity of the thin heating roller.

Although some image formation apparatuses use a power supply of 200 V for obtaining greater power so that the temperature fall is avoided, it is necessary to install a 200 V power supply, which is not a good general purpose solution. Further, there are other image formation apparatuses that use two 100 V 15 A electric power lines; however, it is difficult to have two independent 15 A wall sockets nearby. As described above, the present situation is that the upper limit of power cannot be raised without overcoming difficulties, which increase in power is required in order to raise the temperature of the heating roller in a short time.

Then, Patent References 1 and 2 propose that one of a rechargeable battery and a capacitor be used as an auxiliary power supply so that the maximum available power may be increased, and so that the temperature can be raised in a short time.

According to the conventional auxiliary power supply method, a heating member includes two or more heating elements such as halogen heaters. The first of the heating elements, for example, a halogen heater of 100 V 1200 W is heated by a main power supply 2 (FIG. 1). The second of the heating elements, for example, a halogen heater of 50 V 500 W is heated by the auxiliary power supply.

According to the conventional practice as described above, the power is supplied to the first heating element from the main power supply, and power can be supplied to the second heating element from the auxiliary power supply. The auxiliary power supply, charged with a battery charger, supplies the power at a desired timing according to the available power and the status of the image formation apparatus. In this way, power greater than available only from the main power supply 2 can be supplied to the heating member for heating the heating roller.

With the configuration described above, the temperature of the heating member can be raised to a desired temperature in a short time by simultaneously using the main power supply and the auxiliary power supply, as compared with the case wherein only the main power supply is used. Further, since the auxiliary power supply is discharged as it provides the power, temperature rising becomes slow. Then, when the image formation apparatus hangs up (becomes inoperable), safe maintenance operations can be performed.

Further, a great amount of heat per unit time is consumed, for example, in the case of a high-speed machine, in the case of thick paper, and in the case of continuous fixing operations. Accordingly, maintaining the desired temperature only with the main power supply is difficult; however, with the auxiliary power supply, the problems can be solved. In this case, too, since the temperature rise is decreased as the capacitor is discharged, safe maintenance operations may be conducted should the image formation apparatus hang up (become inoperable), while offering the quick temperature rise.

[Patent reference 1] JPA H10-282821
[Patent reference 2] JPA 2000-315567

DISCLOSURE OF INVENTION

According to the conventional products that are configured as described above, the second (auxiliary) heating element is required, which makes it difficult to miniaturize the heating roller. Further, there is a problem in that the temperature of the small heat-capacity thin roller can be quickly raised, posing a risk when control is lost. In this view, the inventor hereto has proposed a configuration wherein the auxiliary power supply feeds only the DC loads of the image formation apparatus, except for the fixing apparatus. In this way, the AC power available to the fixing apparatus can be increased.

However, the auxiliary power supply is capable of supplying the power for only a limited time, given that the auxiliary power supply is a rechargeable battery. Accordingly, switching between the auxiliary power supply and the main power supply is required to continually provide power to the DC loads. When switching, there can be a difference in outputs, such as an output voltage and power, due to, e.g., a difference in tolerance, and a variation of components used by the power supply. The difference degrades the quality of images produced by the image formation apparatus.

Accordingly, the present invention is to offer an image formation apparatus that is capable of producing a high quality image without image unevenness by providing a configuration that maintains control even if the power supply is switched between a main power supply and an auxiliary power supply.

SUMMARY OF THE INVENTION

The present invention provides an image formation apparatus that substantially obviates one or more of the problems caused by the limitations and disadvantages of the related art.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by an image formation apparatus particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides an image formation apparatus as follows.

Means for Solving a Subject

According to an aspect of the embodiment of the present invention, the image formation apparatus includes a manuscript reading unit for reading a manuscript, a main power supply for supplying power to an alternating-current load (AC load) and a direct-current load (DC load), and an auxiliary power supply that is rechargeable for supplying power to the DC load; wherein, the power to the DC load is provided from one of the main power supply and the auxiliary power supply by switching. Switching of the power supply of the image formation apparatus is carried out while manuscript reading is not being carried out.

According to another aspect of the embodiment of the present invention, the image formation apparatus includes a manuscript reading unit for reading a manuscript, a main power supply for supplying power to the AC load and the DC load, and an auxiliary power supply that is rechargeable for supplying power to the DC load; wherein the power to the DC load is provided from one of the main power supply and the auxiliary power supply by switching; wherein an amplification factor of data that are read is adjusted after the power supply is switched.

According to another aspect of the embodiment of the present invention, the image formation apparatus includes a manuscript reading unit for reading a manuscript, a main power supply for supplying power to the AC load and the DC load, and an auxiliary power supply that is rechargeable for supplying power to the DC load; wherein the power to the DC load is provided from one of the main power supply and the auxiliary power supply by switching. Further, data that are read when the power supply is switched are stored, information about a reading position when the power supply is switched is stored, and the stored data are compensated for according to the reading position information.

That is, if the power supply is switched from the main power supply to the auxiliary power supply, and vice versa, the voltage provided to the DC load (components) of the image formation apparatus can vary. The voltage change especially causes the light intensity of a reading light of the image reading unit, such as a scanner, to change. The different light intensity produces an uneven image. If switching of the power supply is carried out while reading a sheet of the manuscript, its front part and bottom part may not have the same density (darkness). The embodiment of the present invention solves this problem.

The embodiment further provides a capability of continuous operations, i.e., without suspending the reading operation when switching the power supply, wherein compensation for the data that have been read is independently carried out based on the reading position information. This improves the productivity, and avoids excessive discharging of the auxiliary power supply.

Effectiveness of Invention

Since the power supply is switched when no manuscript reading operation is carried out, even if there is a difference in the output voltage due to power supply switching, the density stays constant within the same sheet. That is, the configuration and the switching operations can be simplified, while providing a high quality image.

By adjusting the amplification factor of the data read after switching the power supply, there are no density differences between the sheets of the manuscript read before and after power supply switching. This can be realized with a simple configuration for maintaining control, producing a high quality image.

Since the data that are read and the reading position information at the time of switching the power supply are stored so that the data may be compensated for according to the reading position information, the power supply can be switched at any timing. Accordingly, no interruption of the reading operation is required, improving the productivity; and no over-discharging of the auxiliary power supply is required.

DESCRIPTION OF THE PREFERRED EMBODIMENTS

In the following, embodiments of the present invention are described with reference to the accompanying drawings.

Figure 1:
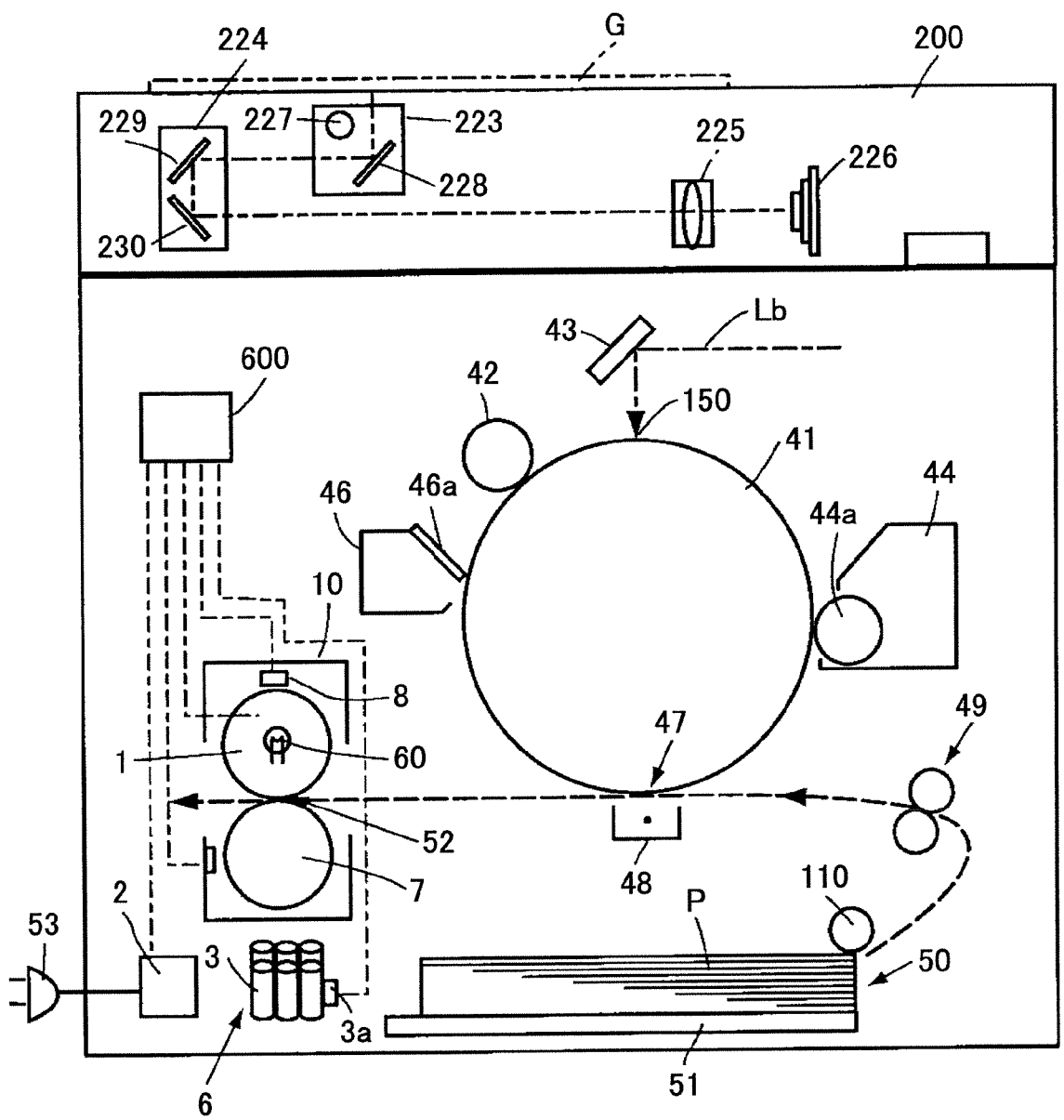
FIG. 1 is a schematic diagram of an image formation apparatus according to an embodiment of the present invention.

FIG. 1 shows an image formation apparatus according to the embodiment of the present invention. The image formation apparatus includes an image reading optical unit 200 at the upper part of the body of the image formation apparatus, which image reading optical unit 200 is for reading a manuscript. The image reading optical unit 200 includes carriages 223 and 224, an image formation lens 225, and a CCD 226. The carriage 223 includes a luminous source 227 and a first mirror 228. The carriage 224 includes a second mirror 229 and a third mirror 230. The carriages 223 and 224 are moved in sub-scanning directions by a driving source such as a motor that is not illustrated. The amount of movement of the carriage 224 is one half of the amount of movement of the carriage 223. In this way, the optical path length from an image reading position on the face of a manuscript G placed on a manuscript placing table 201a to the CCD 226 is maintained constant as the image reading position is moved in the sub-scanning directions.

The luminous source 227 is arranged under the manuscript placing table 201a, and emits light onto the manuscript G. The light is reflected by the manuscript G, and is led to the image formation lens 225 by the first mirror 228, the second mirror 229, and the third mirror 230. Then, the light forms an image of the manuscript G on an image receiving surface of the CCD 226 at a predetermined reduction rate. The CCD 226 is a sensor that reads the image of the manuscript G, and generates an image signal according to the reflected light from the manuscript G.

The image formation apparatus further includes a photo conductor 41, an example of an image supporting member. For example, the image supporting member is in the shape of a drum and is rotatable. Around the photo conductor 41 that is arranged inside the body of the image formation apparatus, an electrification unit 42 that is an electrification roller, a mirror 43 that constitutes an exposure unit, a development unit 44 that includes a developing roller 44a, a transfer unit 48 that transfers a developed image onto a printing medium P, a cleaning unit 46 that includes a blade 46a that makes sliding contact with the perimeter of the photo conductor 41, etc., are arranged clockwise in this sequence.

Exposure light Lb is reflected by the mirror 43 and scans the surface of the photo conductor 41 between the electrification unit 42 and the developing roller 44a. A position that is irradiated by the exposure light Lb is called an exposure position 150.

The transfer unit 48 is arranged countering the front surface of the photo conductor 41 so that a transfer section 47 is formed. The printing medium P is conveyed from a paper feed tray 51 of a feed apparatus 50 to the transfer section 47 by a feed roller 110 and a resist roller pair 49 that are parts of a non-illustrated conveyance system. A toner image on the photo conductor 41 is electrostatically transferred onto the conveyed printing medium P at the transfer section 47 by a transfer bias voltage applied by the transfer unit 48. The printing medium P that carries the toner image is conveyed from the transfer section 47 to a fixing unit 10 arranged down-stream by a non-illustrated conveyance roller that is part of the conveyance system.

The fixing unit 10 and its associated components are described.

Figure 2:
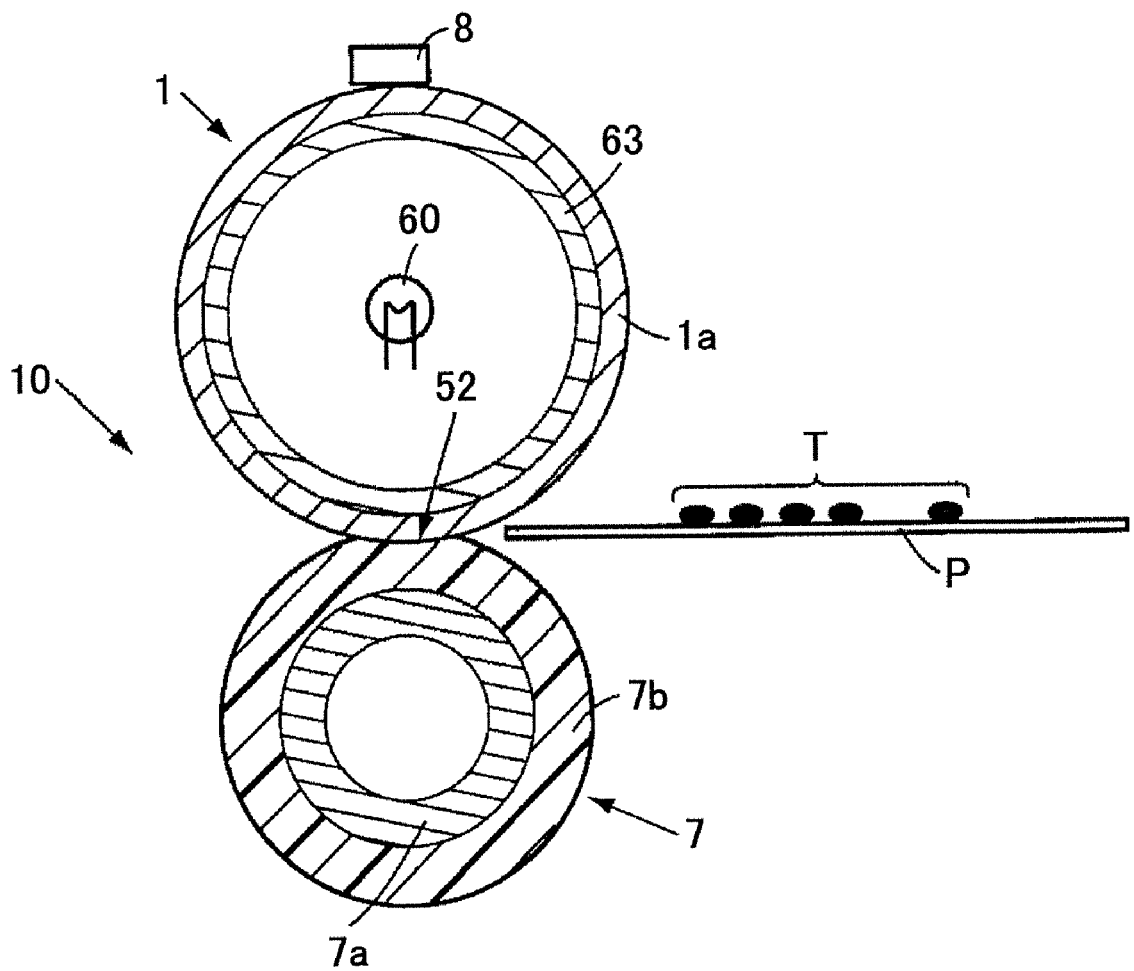
FIG. 2 is a cross-sectional diagram of a fixing apparatus of a roller fixing system according to an embodiment of the present invention.
Figure 3:
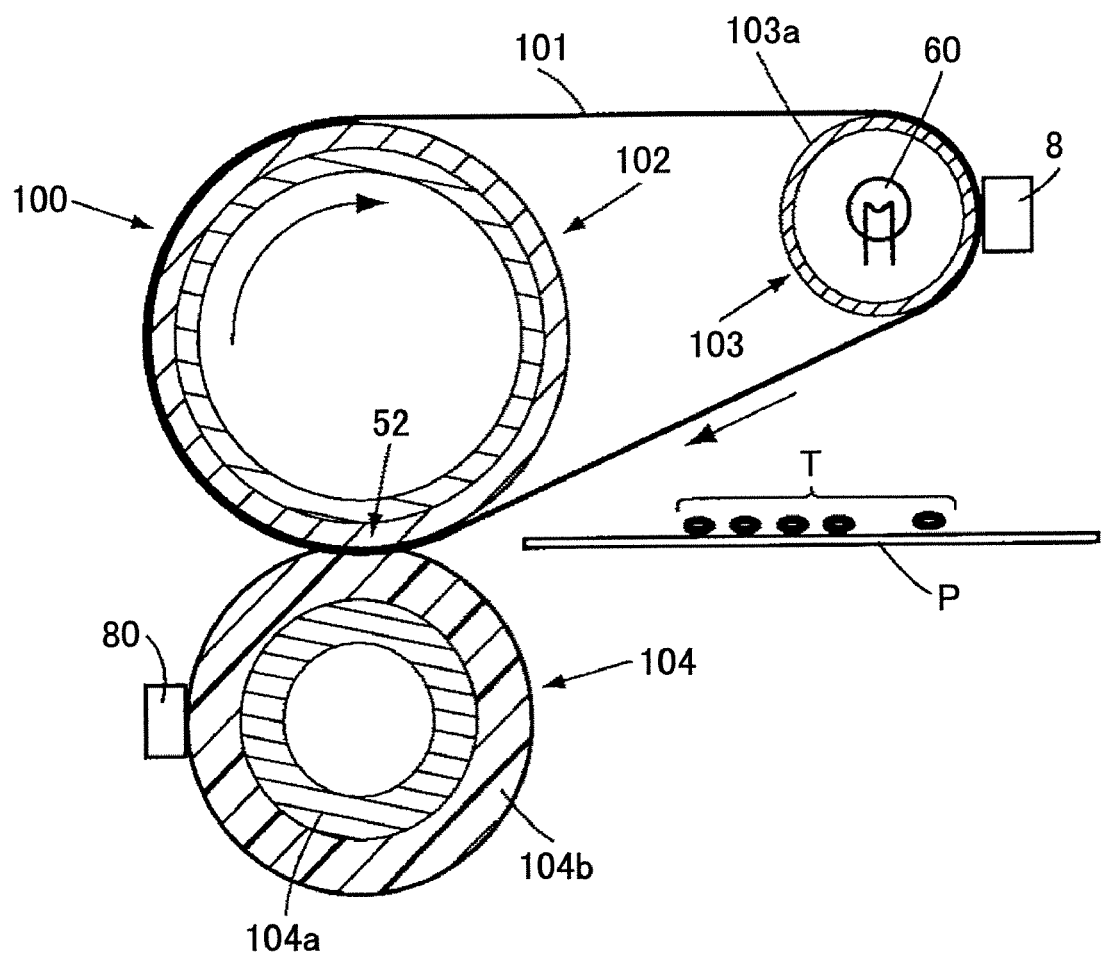
FIG. 3 is a cross-sectional diagram of the fixing apparatus of a belt fixing system according to an embodiment of the present invention.

The fixing unit 10 may use a roller fixing system as shown in FIG. 2 or a belt fixing system as shown in FIG. 3. The fixing unit 10 of the image formation apparatus shown in FIG. 1 employs the roller fixing system; however, the belt fixing system can be used.

The fixing unit 10 includes a heating roller 1 that is rotationally driven by a driving source that is not illustrated, and a pressing roller 7 that contacts the perimeter surface of the heating roller 1 with pressure such that a nip 52 is formed. The printing medium P carrying the toner image T that is yet to be fixed is conveyed into the nip 52. Then, the toner image T is fixed to the printing medium P by heat and pressure at the nip 52. The heating roller 1 includes a halogen heater 60 as a heating element. The halogen heater 60 is provided with electric power for generating heat. The temperature of the surface of the halogen heater 60 is raised to a predetermined fixing temperature. The toner image T shown in FIG. 2 is yet to be fixed.

A fixing unit 100 employing the belt fixing system is shown in FIG. 3. The fixing unit 100 includes a fixing belt 101 that is an endless belt serving as a fixing member. The fixing unit 100 further includes a fixing roller 102 and a heating roller 103. The fixing belt 100 is wound around the fixing roller 102 and the heating roller 103. The fixing unit 100 further includes a pressing roller 104 that forms the nip 52 with the fixing roller 102, the fixing belt 101 being in between. The printing medium P carrying the toner image T is conveyed to the nip 52, and the toner image T is fixed to the printing medium P by heat and pressure at the nip 52.

The heating roller 103 includes the halogen heater 60 as the heating element. The heating roller 103 is heated by the halogen heater 60 that is heated by electric power. The temperature of the surface of the fixing belt 101 is raised to the predetermined fixing temperature. The fixing roller 102 and the pressing roller 104 are rotationally driven by a non-illustrated driving source such as a driving motor so that the printing medium P is conveyed. Accordingly, with reference to FIG. 3, the fixing roller 102 is rotationally driven in a clockwise direction, the fixing belt 101 follows the clockwise rotation, and the pressing roller 104 is rotationally driven in a counterclockwise direction. The driving system may be configured such that either the fixing roller 102 or the pressing roller 104 may be rotationally driven by receiving a driving force.

With reference to FIG. 2, the heating roller 1 includes a roller main body 63 that is made of metal and shaped like a cylinder. The halogen heater 60 is placed inside the roller main body 63. The halogen heater 60 heats the roller main body 63 by radiant heat so that the temperature of the heating roller 1 is raised. The roller main body 63, serving as the main body of the heating roller 1, is preferably made of metal such as aluminum and iron in order to obtain the desired durability and resistance against deformation by pressure. According to the present embodiment, a mold-releasing layer 1a for preventing adhesion of the toner, and the like, is formed on the perimeter surface of the roller main body 63. That is, the mold-releasing layer 1a serves as the roller surface. It is desired that the inside of the heating roller 1, specifically, the inner surface of the roller main body 63, be blackened for efficiently absorbing the heat of the halogen heater 60. The pressing roller 7 includes a metal core 7a and an elastic layer 7b made of, e.g., rubber. The elastic layer 7b is formed on the perimeter surface of the metal core 7a. Accordingly, the elastic layer 7b adequately provides elastic deformation for forming the nip 52 with the heating roller 1 for fixing by heat and pressure.

With reference to FIG. 3, the diameter of the heating roller 103 is less than the diameter of the fixing roller 102. The heating roller 103 includes a roller main body 103a that is made of metal and shaped like a cylinder. The halogen heater 60 is placed in the roller main body 103a and heats the roller main body 103a by the radiant heat. The surface temperature of the heating roller 103 is raised and the temperature of the fixing belt 101 is raised. Since the heating roller 103 gives tension to the fixing belt 101 without countering the pressing roller 104, the thickness of the roller main body 103a is less than the thickness of the heating rollers 1 shown in FIG. 2. Accordingly, the metal part is formed thin with a small diameter, that is, the heat capacity of the heating roller 103 is smaller than the heating roller 1. For this reason, an auxiliary heater that is conventionally required becomes unnecessary. It is desired that the inside of the heating roller 103, i.e., the inner surface of the roller main body 103a, be blackened for efficiently absorbing the heat of the halogen heater 60. The pressing roller 104 includes a metal core 104a and an elastic layer 104b made of such as rubber. The elastic layer 104b is formed on the perimeter surface of the metal core 104a. Accordingly, the elastic layer 104b provides adequate elastic deformation for properly forming the nip 52 with the heating roller 102 for fixing by heat and pressure.

Figure 5A:
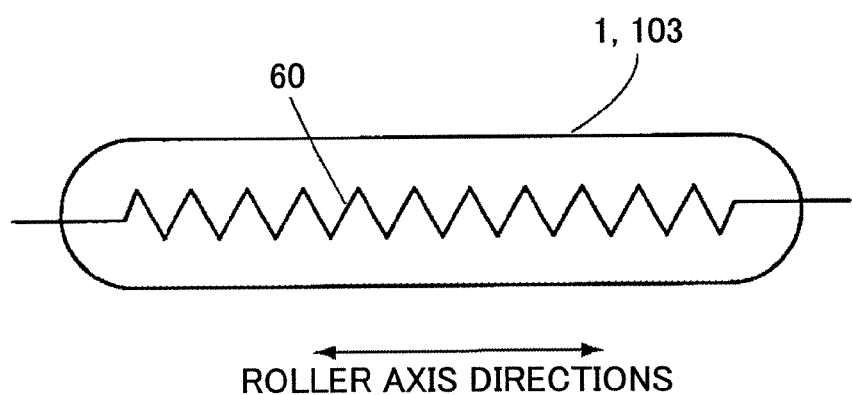
FIG. 5A is a schematic diagram of a heating member, wherein the heating member is arranged almost throughout in directions of a roller axis.
Figure 5B:
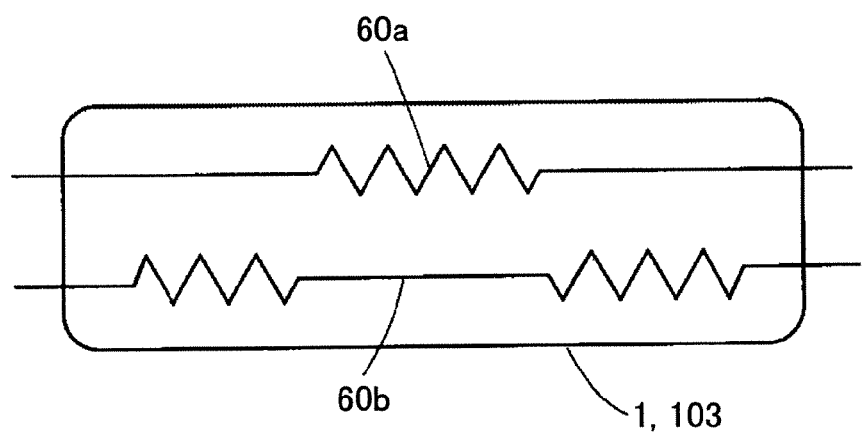
FIG. 5B is a schematic diagram of the heating member, wherein heating elements are shifted in the directions of the roller axis.

According to the present embodiment, the halogen heater 60 outputs 1200 W at 100 V. The halogen heater 60 can be structured by one element heating the entire length in the directions of the axis of the heating roller as shown in FIG. 5A. Alternatively, two elements may be used; namely, a first heater 60a for heating only the central part, and a second heater 60b for heating both ends as shown in FIG. 5B, wherein the power supply to each element is controlled according to the paper size so that temperature rise of a part where no imprinting medium is present may be avoided. Here, the two heating elements function as the main heater, i.e., neither function as an auxiliary heater.

Figure 4:
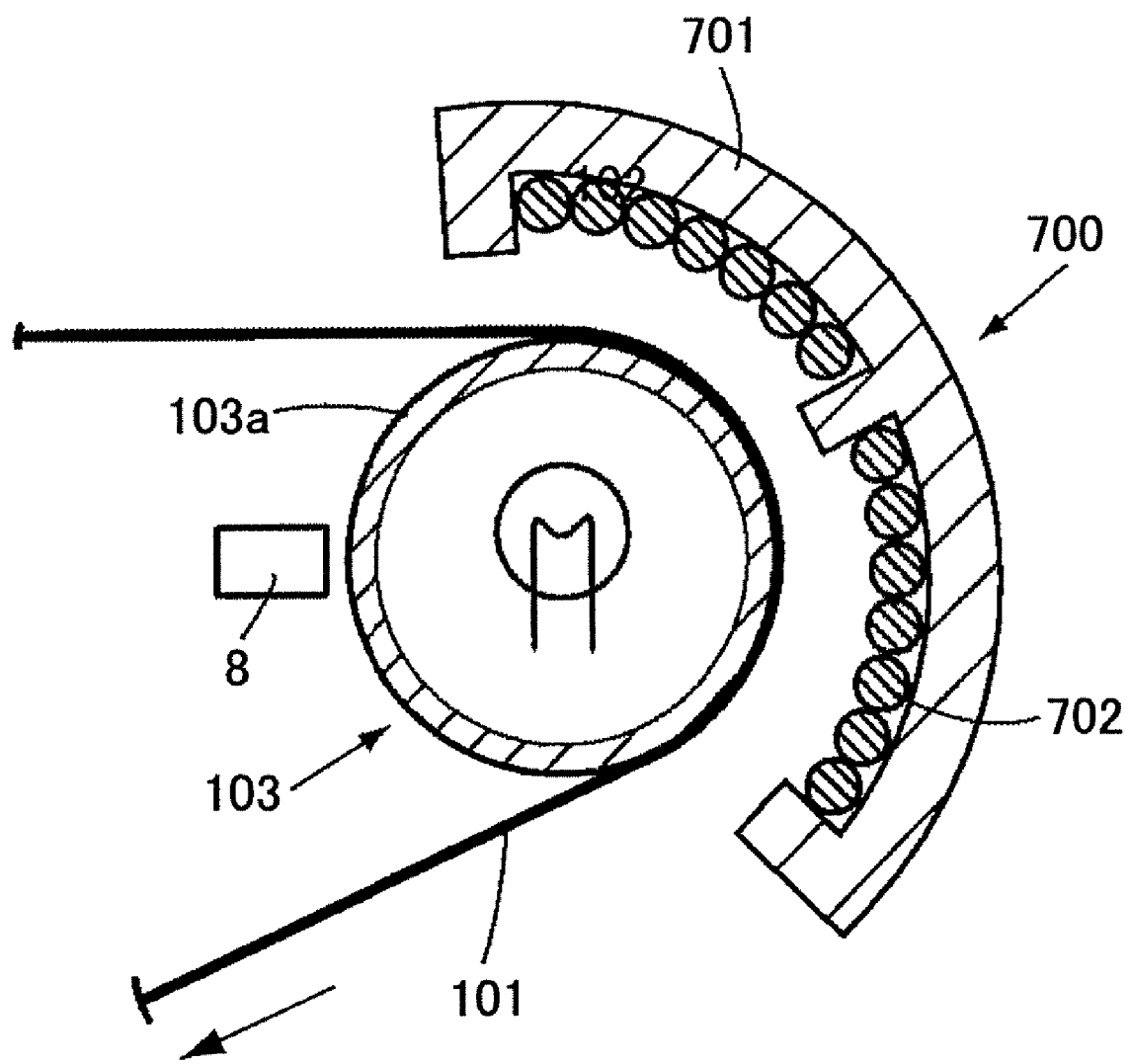
FIG. 4 is a cross-sectional diagram a heating unit that includes a magnetic flux generating unit.

Although the heat is generated by the halogen heater 60 according to the present embodiment, the heat can be generated by other ways. For example, a ceramic heater shaped like a plate can be arranged in the heating roller 1. Further alternatively, the heat can be obtained by induction heating of a magnetic flux-induction generating unit 700 that is configured as shown in FIG. 4. Specifically, the magnetic flux-induction generating unit 700 includes a coil 702 that is wound around a circular core 701. A high frequency current is supplied to the coil 702 so that the core 701 is heated by induction heating, and the temperature is raised. In this case, the coil 702 serves as the heating component, and the core 701 is heated. Further, in this case, it is not necessary that the heating roller 103 itself be heated; the halogen heater may be dispensed with.

In a first case wherein the halogen heater 60 is used, its power is generally controlled by mixing an ON period and an OFF period so that desired average power is obtained, which is implemented by turning on and turning off the power supply, phase control, zero cross control, etc. Although the first case is advantageous in that the temperature can be quickly raised, it is difficult to finely adjust the power. On the other hand, in a second case wherein the magnetic flux-induction generating unit 700 is used, the output power for heating can be finely adjusted by changing the frequency of the high frequency current supplied to the coil 702, which is an advantage of induction heating. Further, in the second case, a halogen heater can be optionally provided inside the heating roller 103 such that the heating roller 103 is kept warm while it is not rotating, such as in a standby mode.

In the image formation apparatus according to the present embodiment, an image is formed as follows. The photo conductor 41 begins rotation, the photo conductor 41 is uniformly charged by the electrification unit 42 during the rotation, and a latent image corresponding to an image to be produced (copied/printed) is formed on the photo conductor 41 by irradiating the exposure light Lb and scanning at the exposure position 150. The latent image is based on image information acquired by the image reading optical unit 200. The latent image is moved to the development unit 44 with the rotation of the photo conductor 41, where a visible image is formed by the toner, that is, a toner image is formed.

On the other hand, the printing medium P on the paper feed tray is conveyed by the feed roller 110 through a conveyance course shown by a broken line in FIG. 1. The printing medium P stops at the resist roller pair 49, and waits for a timing so that the position of the printing medium P may agree with the position of the toner image on the photo conductor 41 at the transfer section 47. When the timing comes, the printing medium P stopped at the resist roller pair 49 is sent out from the resist roller pair 49, and conveyed toward the transfer section 47. The toner image on the photo conductor 41 and the printing medium P meet at the transfer section 47. The toner image is transferred onto the printing medium P by the electric field produced by the transfer unit 48.

In this way, the printing medium P that carries the toner image is sent out toward the fixing unit 10, which toner image has been formed by an image formation section that includes the photo conductor 41 and other components arranged on the perimeter of the photo conductor 41. The heating roller 1 of the fixing unit 10 is heated to the predetermined fixing temperature by the halogen heater 60, to which power is supplied. When the printing medium P carrying the toner image passes through the nip 52 of the fixing unit 10, the toner image is fixed to the printing medium P by heat and pressure; then the printing medium P is delivered to a non-illustrated delivery unit. Residual toner that remains on the photo conductor 41, which residual toner has not been transferred to the printing medium P at the transfer section 47, is removed by the cleaning apparatus 46 with rotation of the photo conductor 41. Then, the image formation apparatus is ready for the next image formation.

Next, the power supply system of the image formation apparatus is described.

Figure 6:
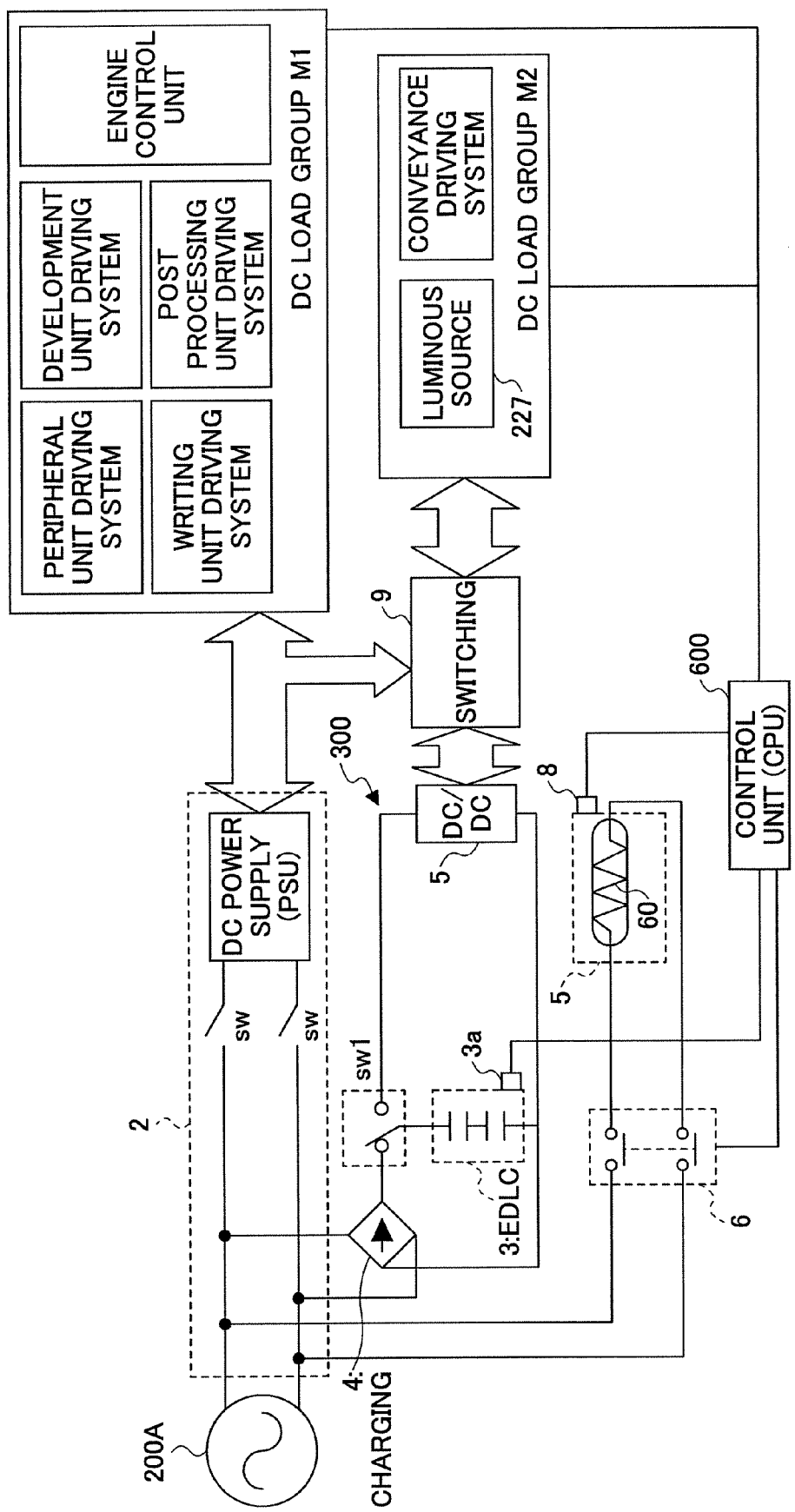
FIG. 6 is a block diagram of the main part of a power supply control unit of the image formation apparatus according to the embodiment of the present invention.

As shown in FIG. 6, the image formation apparatus includes a main power supply 2 and an auxiliary power supply 300. The main power supply 2 obtains electric power from a commercial power supply 200A, and supplies electric power to an AC load and a DC load of the image formation apparatus. The auxiliary power supply 300 includes a storage battery 3, a battery charger 4, and a voltage regulation unit 5, and supplies electric power to the DC load of the image formation apparatus. In the auxiliary power supply 300, the storage battery 3 is charged by the battery charger 4, and the voltage regulation unit 5 generates DC voltages required of the DC load. According to the present embodiment, the required voltages are 24 V and 5 V.

According to the present embodiment, the AC load includes the halogen heater 60 of the fixing unit 10 shown in FIG. 6; and the DC load includes DC load groups M1 and M2 that require the voltages 24 V and 5 V. The DC load group M1 includes an engine control unit such as a CPU and a display unit, a peripheral unit driving system, a development unit driving system, a writing unit driving system, a post processing unit driving system, and fans. The DC load group M2 includes the luminous source 227 and a conveyance driving system.

The DC load group M1 is driven only by the main power supply 2. The power supply to the DC load group M2 is switched between the main power supply 2 and the auxiliary power supply 300. According to the present embodiment, selection of the power supply is carried out by the control unit 600 according to a detection result of power available from the auxiliary power supply 300. If the power available from the auxiliary power supply 300 becomes insufficient, the DC load group M2 is powered by the main power supply 2.

The control unit 600 determines operations based on operational information of various units of the image formation apparatus, and controls the power supplied to the fixing unit 10 according to temperature information from a thermo sensor 8 for detecting the temperature of the fixing unit 10.

The thermo sensor 8 is one of a thermistor, a thermoelectric couple, an infrared temperature detection apparatus, etc., and is for providing the temperature information to the control unit 600. The control unit 600 controls start, stop, and adjustment of the power supplied to the halogen heater 60 of the fixing unit 10 based on the acquired temperature information.

The auxiliary power supply 300 includes a detecting unit 3a for detecting the status of the storage battery 3. The control unit 600 controls the power supplied from the auxiliary power supply 300 and a charging state, according to various status information items such as storage battery temperature, fault detection results, and available power provided by the detecting unit 3a.

The main power supply 2 obtains electric power from the commercial power supply 200A through a plug 53 shown in FIG. 1, and supplies power to the AC load and the DC load of the image formation apparatus as shown in FIG. 6. Generally, current capacity of the commercial power supply 200A is limited to about 15 A at 100 V in Japan. Accordingly, the maximum that the main power supply 2 can supply is about 1500 W. To the AC load such as the halogen heater 60, the commercial power as it is can be supplied with no conversion of the frequency and the voltage; however, the AC load may be supplied with frequency converted and/or voltage converted power. To the DC load such as the DC load groups M1 and M2, the commercial AC 100 V power is converted into DC 5 V and 24 V, and the converted power is supplied.

The auxiliary power supply 300 includes the storage battery 3 that is, for example, an electrical-double-layer capacitor that is charged by the battery charger 4 based on power from the main power supply 2. The battery charger 4 converts the AC of the main power supply 2 to DC, and performs voltage regulation so that power appropriate for storing in the storage battery 3 is generated according to a state of the auxiliary power supply 300. Specifically, charging is performed according to the detection information provided by the detecting unit 3a that detects the status of the auxiliary power supply 300. If sufficient charge is detected, charging is suspended, and charging is started if the charge becomes insufficient.

The auxiliary power supply 300 provides DC power to the DC load group M2 through the voltage regulation unit 5. The voltage regulation unit 5 essentially is a DC/DC converter for adjusting the output from the auxiliary power supply 300 to the constant voltage of DC 24 V, which voltage is used by, e.g., motors and the luminous source 227.

Since the power of the auxiliary power supply 300 is available in addition to the power provided by the main power supply 2, according to the present embodiment, power that can be provided to the image formation apparatus is greater than the rated power of the commercial power supply 200A. As the storage battery 3, not only the electrical-double-layer capacitor, but also other rechargeable batteries, such as Li ion, nickel hydrogen, lithium ion, and false capacity capacitor using oxidization reduction, etc., can be used. Further, any combination of these batteries can be used.

The present embodiment uses the electrical-double-layer capacitor, where no chemical reaction takes place, unlike other rechargeable batteries. The electrical-double-layer capacitor has further advantages as described below.

The first of the advantages is that it can be charged in a short time. If the auxiliary power supply 300 uses the common nickel-cadmium battery as the rechargeable battery, it takes from dozens of minutes to several hours for charging; that is, power greater than the commercially rated power is available only a limited number of times a day every several hours. This is not practical. Conversely, the auxiliary power supply 300 uses the electrical-double-layer capacitor that can be quickly charged, typically in dozens of seconds to several minutes; that is, the electrical-double-layer capacitor can be charged during no printing periods when the main power supply 2 has sufficient allowance for charging. In this way, the auxiliary power supply 300 is available much oftener for the DC load group M2 such that main power required for heating may be sufficiently available.

The second advantage is in that the service life of the electrical-double-layer capacitor is 10,000 charging cycles or greater, while the service life of the nickel-cadmium battery is 500 to 1000 charging cycles requiring oftener replacements. In the case of a lead battery, liquid exchange and supplement are required, which are not required of the electrical-doublelayer capacitor. Accordingly, with the electrical-double-layer capacitor, maintenance is hardly needed.

The third advantage of the electrical-double-layer capacitor is in that its internal resistance is less than 5 mΩ, and a current greater than 20 A can be obtained with less loss than other rechargeable batteries such as the lithium battery and the nickel hydride battery. The capacity of the electrical-double-layer condenser is increasing, with applications to cars being already a realistic object. For example, the electrical-double-layer capacitor developed by Nippon Chemi-Con Corp. has a capacity of about 2000 F and is rated at 2.5 V. JEOL Co., Ltd. has announced a technique of a nano gate capacitor that has an energy density ranging from 50 to 75 W·h/kg and a standing voltage rated at 3.2-3.5 V, which energy density represents 5 to 10 times the conventional technology.

According to the present embodiment, 8 electrical-double-layer capacitors are connected in series to constitute a 20 V module for the auxiliary power supply 300, wherein each electrical-double-layer capacitor has a capacity of 1200 F rated at 2.5 V with an internal resistance of less than 5 mΩ. Dimensions of each electrical-double-layer capacitor are about 120 mm long and about 40 mm in diameter. In order to obtain a voltage balance between the cells (electrical-double-layer capacitors) that are connected in series, a voltage balancing unit (not illustrated) can be provided to obtain stable operations for a long term. The auxiliary power supply 300 starts power supply at 200 W at 20 V when fully charged and stops the power supply when the voltage is reduced to a predetermined voltage that is about 10 V, half of the starting voltage.

The voltage, 20 V, provided by the auxiliary electric power supply 300 is raised to the constant voltage of DC 24 V by the voltage regulation unit 5, and the regulated voltage is supplied the DC load group M2. Alternatively, the number of the electrical-double-layer capacitors may be increased to obtain a higher voltage, and the higher voltage is regulated down to the required voltage. Further, in this case, when the output voltage becomes below the required voltage, the output voltage may be raised to the required voltage.

Next, a power supply pattern of the image formation apparatus is described with reference to FIG. 7.

The auxiliary power supply 300 is capable of supplying power less than the rated power of the halogen heater 60. Specifically, the rated power of the halogen heater 60 is 1200 W; power Wfus_run provided to the halogen heater 60 from the main power supply 2 is 900 W; then, the difference of the two, namely, 300 W is supplied by the auxiliary power supply 300 to achieve the rated power.

The voltage regulation unit 5 includes the DC/DC converter for converting the output voltage from the auxiliary power supply 300 into the predetermined voltage according to the load of the image formation apparatus. The voltage regulation unit 5 supplies power from the main power supply 2 to the auxiliary electric power supply 300 for charging in addition to the fixing unit 10. The voltage regulation unit 5 supplies the constant voltage of DC 24 V to the DC load group M2 such as the motors that require comparatively great power; however, the voltage does not have to be really constant, but it can fluctuate within a tolerance range of the load.

Figure 7:
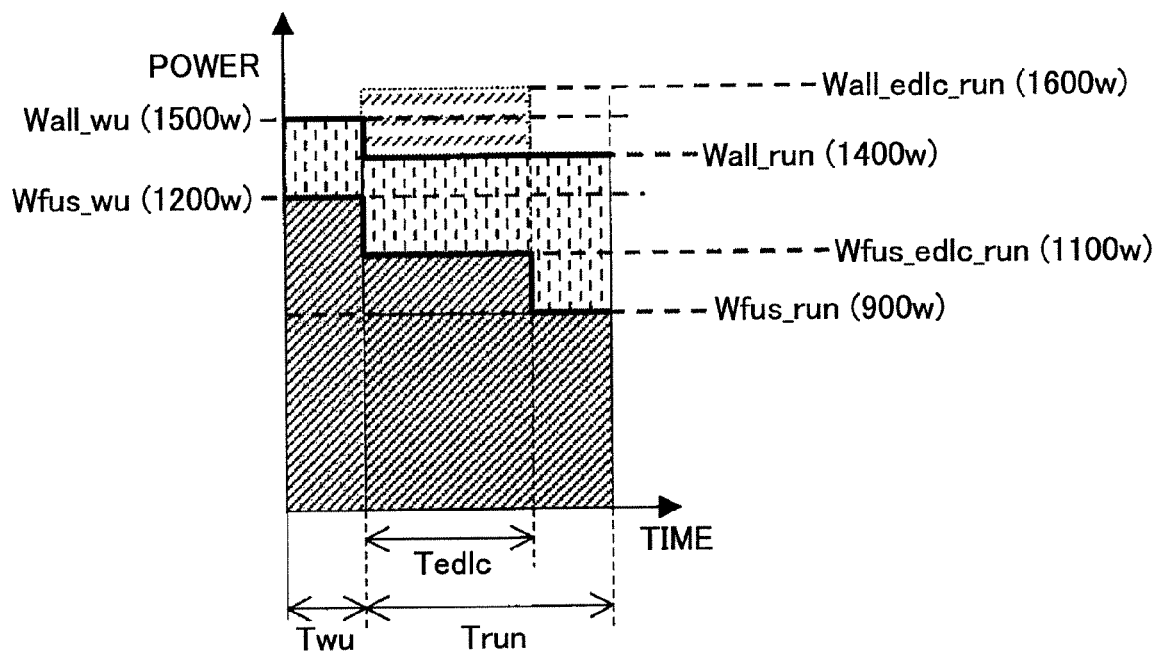
FIG. 7 is a graph showing a power supply pattern wherein an auxiliary power supply is used when a recording medium (paper) is processed (i.e., in operation)

FIG. 7 shows relationships between operational states of the image formation apparatus and the power supplied, wherein the vertical axis represents the power supplied, and the horizontal axis represents time. As shown in FIG. 7, during a standup period Twu, the image formation apparatus is started and prepares for operations, i.e., the temperature of the heating roller 1 starts rising, the main power supply 2 supplies 1200 W to the halogen heater 60 (Wfus_wu) and 300 W to other DC loads, totaling 1500 W. During the standup period Twu, the power is supplied to the drive systems, such as the engine control unit, which drive systems require comparatively low power. For this reason, the requirements can be met by the main power supply 2 alone during the startup period Twu. This situation is also shown at the left-hand most section of FIG. 8.

If printing starts, the power required of image formation operations is increased by such as the paper conveyance motor, the luminous source 227 of the image reading optical unit 200, the sensor, and the drive motor of the development unit. The power required of the DC load is increased from 300 W required in the starting period Twu to 500 W, for example. AC power required of the fixing system can be about 900 W (Wfus_run) when the fixing system containing the heating roller 1 is already warmed. That is, the total of 1400 W (Wall_run) is sufficient for the printing operations.

However, the fixing unit 10 having a small heat capacity for raising the temperature in a short time cannot store a sufficient amount of heat, and the power required immediately after starting printing becomes great. For example, with an image formation apparatus that becomes ready for printing at a print rate of about 65 cpm in 30 seconds, power of about 1100 W (Wfus_edlc_run) is required of the fixing unit 10 immediately after starting. The power of 1100 W (Wfus_edlc_run) is required of the fixing unit 10 in addition to the power 500 W required for a DC system section other than the fixing unit, and the total requirement becomes 1600 W (Wall_edlc_run). That is greater than the rated-power 1500 W available from the commercial power supply 200A.

However, the power 1100 W (Wfus_edlc_run) of the fixing unit 10 is not always needed during processing the recording medium P, but is required only for a short time of several minutes immediately after starting. Here, according to the present embodiment, the auxiliary power supply 300 provides complimentary power of about 200 W during a period Tedlc that lasts several minutes. In this way, the power 1100 W (Wfus_edlc_run) required by the fixing unit 10 is made available.

Specifically, where the DC load requirement is 500 W, 200 W is provided by the auxiliary power supply 300, and 300 W is provided by the main power supply 2. In this way, the requirement of the DC load for the main power supply 2 based on the commercial power supply 200A is decreased to 300 W. Accordingly, the total power that the commercial power supply 200A is to provide becomes within the rated 1500 W (Wall_wu).

Figure 8:
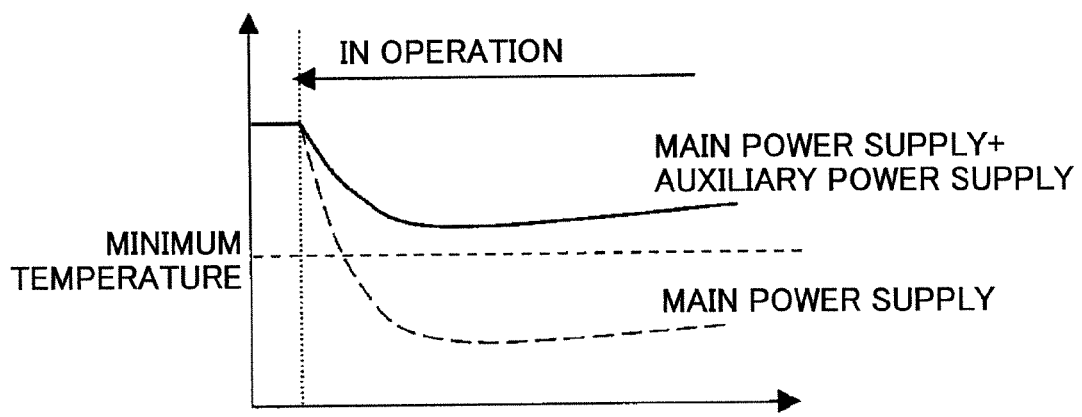
FIG. 8 is a graph showing temperature changes with and without the auxiliary power supply when the recording medium is processed.

On the other hand, conventionally, the thickness of the roller is made great in order to store heat, taking a long time at starting. The stored heat helps decrease the power shortage immediately after starting. According to conventional practice, an auxiliary power supply is used to heat an auxiliary heater such that the power shortage is supplemented. For this reason, when recording media (sheets of paper) are continuously processed, the fixing unit 10 cannot maintain the temperature with the main power supply 2 alone; and then, additional heat is provided by the auxiliary heater powered by the auxiliary power supply 300 so that the temperature is maintained as shown in FIG. 8. In this way, the number of the sheets per unit time can be great, i.e., high-speed service is available, and thick paper can be processed.

Further, where a detection unit is provided for detecting an amount of remaining power and the voltage of the auxiliary power supply 300, if it is determined that the amount of the remaining power is less than a predetermined value, the power supply from the auxiliary power supply is suspended during image formation operations so that printing speed is reduced, dropping the productivity of printing (reducing the print rate (cpm)), for maintaining the image quality. If it is determined that there is no power remaining before starting printing, the print rate (cpm) is reduced from the beginning so that the image quality is maintained.

Figure 9:
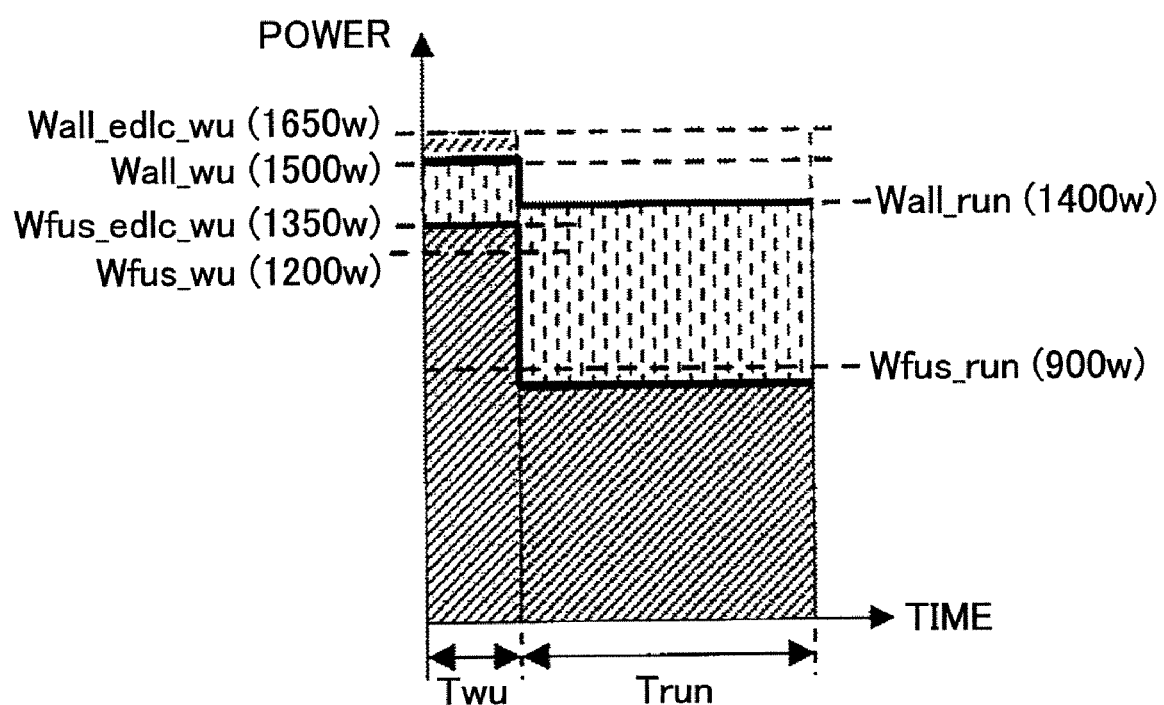
FIG. 9 is a graph showing the power supply pattern using the auxiliary power supply from the beginning.
Figure 10:
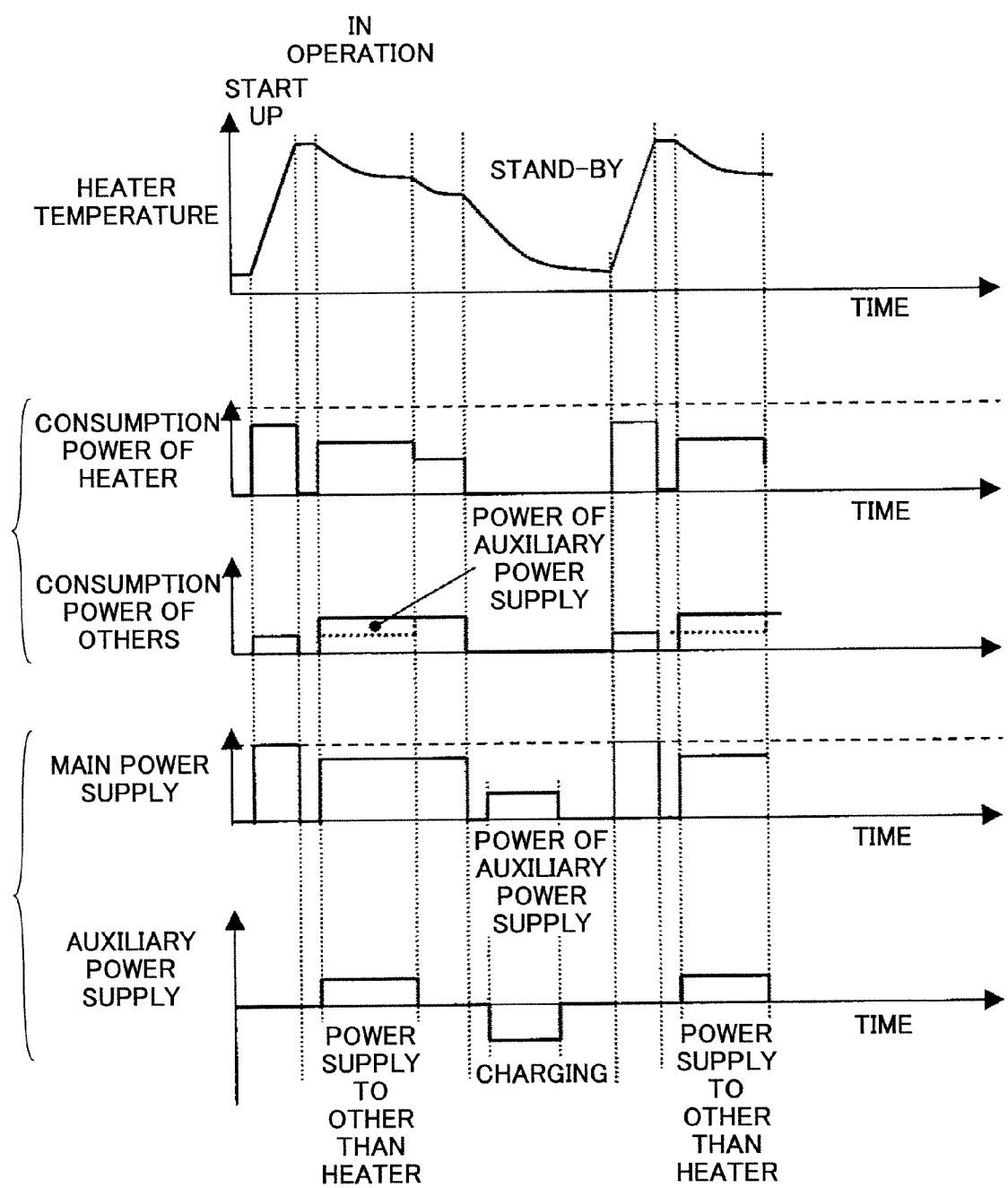
FIG. 10 gives graphs showing the temperature of the heating member, power supply requirements of the image formation apparatus, and power provided by a main power supply unit and the auxiliary power supply unit.
Figure 11:
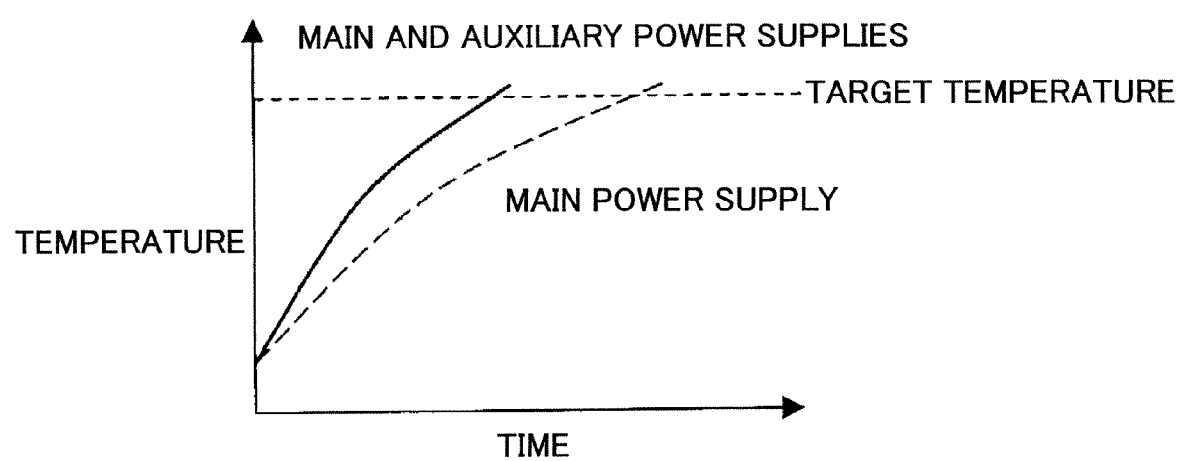
FIG. 11 is a graph showing temperature rising characteristics of the heating member with and without the auxiliary power supply unit.

Returning to the present embodiment, as shown in FIGS. 9 through 11, it can be arranged such that the auxiliary power supply 300 does not provide the power to the system section at the time of processing the recording medium P, but that the auxiliary power supply 300 provides the power to the system section at the time of starting. In this way, the time required of starting can be shortened.

FIG. 9 shows the power supply pattern to the system section and the halogen heater 60 of the image formation apparatus when starting up, and while running. FIG. 10 shows the temperature change of the heating roller 1 (heating member), consumption power of the system section and the halogen heater 60, and power provided by the main power supply and the auxiliary power supply. FIG. 11 shows temperature rising characteristics of the heating roller 1. In FIG. 9, the vertical axis represents the amount of the power required, and the horizontal axis represents the time. In FIG. 11, the vertical axis represents the temperature of the heating roller 1, and the horizontal axis represents the time.

With reference to FIG. 9 and FIG. 10, the power required in the starting period Twu of the system section is 300 W, leaving 1200 W as the power available to the fixing system (the halogen heater 60), if without the auxiliary power supply 300. With the auxiliary power supply 300 added to in the starting period Twu, the power (Wfus_edlc_wu) of the halogen heater 60 can be made into, e.g., 1350 W until the temperature reaches the predetermined fixing temperature. With the additional power of 150 W provided by the auxiliary power supply 300, the temperature of the halogen heater 60 can be raised in less time as shown FIG. 11.

Figure 12:
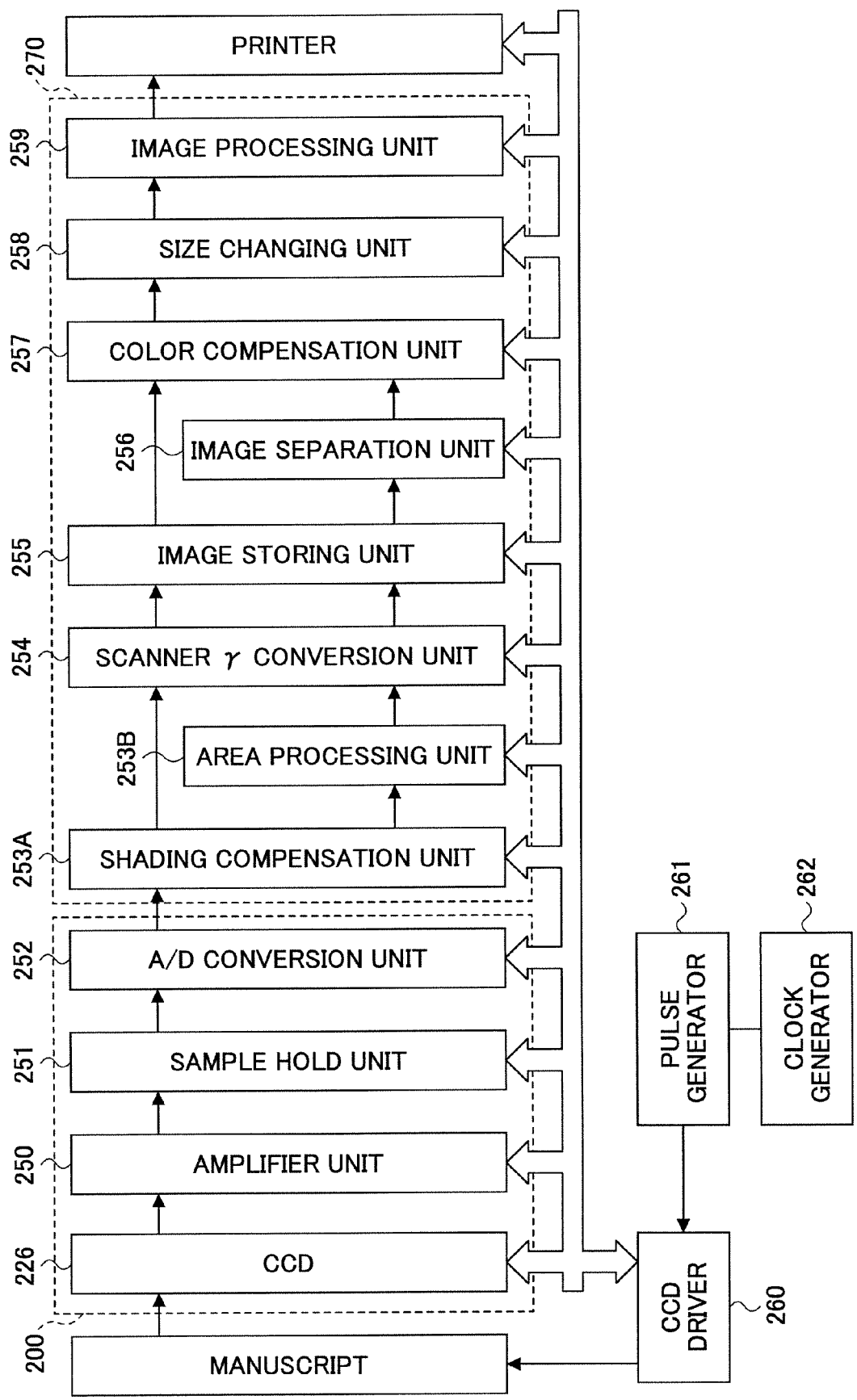
FIG. 12 is a block diagram of the image formation apparatus, showing an image processing configuration.

Next, with reference to FIG. 12, an image formation process of a manuscript is described, which manuscript has been read by the image reading optical unit 200 of the image formation apparatus shown in FIG. 1. The image reading optical unit 200 includes the CCD 226, an amplifier unit 250, a sample hold (S/H) unit 251, an A/D conversion unit 252, a CCD driver 260, a pulse generator 261 and a clock generator 262.

The luminous source 227 (FIG. 1) of the image reading optical unit 200 irradiates light to a calibration pattern and the manuscript to be copied, and the reflected light reaches the CCD 226 (FIG. 1) through the reflective mirrors 228, 229, 230, and the image formation lens 225 (FIG. 1). The CCD 226 generates an analog signal corresponding to the light that reaches the CCD 226. The analog signal is then amplified by the amplifier unit 250. In order to convert the analog signal into a digital signal, the S/H unit 251 holds samples of the amplified signal at every predetermined time. An analog value of the sample is converted into the digital signal by the A/D conversion unit 252, for example, in 8 bits.

A factor of the amplification (amplification factor) of the amplifier unit 250 is adjusted so that the digital signal may be settled within the range that can be expressed by, e.g., the 8 bits. That is, the amplification factor of the amplifier unit 250 is selected so that the output value of the A/D conversion unit 252 after reading a certain specific manuscript density may turn into a desired value.

The amplification factor is adjusted by the following process, for example.

First, the amplification factor of an amplifier and the amount of the light are fixed to corresponding predetermined values, and the electrical signal of the CCD 226 is scanned. Next, the strength (level) of the analog signal that the amplifier 13 outputs is provided to a CPU (not shown), a magnification parameter for adjusting the amplification factor is selected in comparison with a desired value, and the amplification factor of the amplifier unit 250 is adjusted. The amplifier unit 250 decreases the amplification factor such that a signal that would give a value, e.g., 240 with an ordinary amplification factor after A/D conversion may become, e.g., 180 when a shading compensation is performed. This is for increasing the sensitivity of the shading compensation. Otherwise, i.e., if the shading compensation is performed with the ordinary amplification factor, the 8-bit signal obtained by the A/D conversion may be saturated at the greatest digital value 255 $(FF)_{hex}$ that is equal to 255 in decimal if the amount of the light is great, and an error may occur in the shading compensation.

The CCD driver 260 supplies a pulse signal for driving the CCD 226. The pulse generator 261 supplies a pulse for driving the CCD driver 260, and supplies the required timing for the S/H unit 251 to carry out the sample hold of the signal from the CCD 226. The clock generator 262 is made of, e.g., a crystal oscillator, and supplies a reference signal for the pulse generator 261.

Next, an IPU section 270 of the image formation apparatus, which image formation apparatus is a copying machine, for example, is described. As shown in FIG. 12, the IPU section 270 includes a shading compensation unit 253A, an area processing unit 253B, a scanner γ conversion unit 254, an image storing unit 255, an image separation unit 256, a color compensation unit 257, a size changing unit 258, and an image processing unit 259.

The shading compensation unit 253A of the IPU section 270 is for compensating for a white level (a signal when the amount of the light is great). Specifically, the shading compensation is carried out by a luminous source (not illustrated) moving to a white reference plate (not illustrated), and irradiating a light; then, fluctuations in white data due to variations in a reflective mirror (not illustrated) and an image formation lens (not illustrated), and due to changes of the sensitivity of the CCD 226, and the like are rectified.

The area processing unit 253B generates an area signal for identifying an area, to which area image data of the manuscript that are currently being processed belong. In accordance with the area signal generated by the area processing unit 253B, image processing parameters to be used in later processes are switched (selected). That is, the area processing unit 253B generates the area signal by comparing area information specified on the manuscript G with the reading position information at the time of image reading. Then, based on the area signal, the parameters used by the scanner γ conversion unit 254, the color compensation unit 257, and the image processing unit 259 are changed. Although these parameters for image processing are selected from a table of usual image-processing parameters, selection may be made from a table of image-processing parameters corresponding to reading characteristics of the color copying machine calculated by a parameter operation unit.

(Example of Comparison)

As described above, the CCD 226 reads the reflected light of the luminous source 227. Here, the luminous source 227 belongs to the DC load group M2 as shown in FIG. 6, the power supply to which luminous source 227 is switched between the main power supply 2 and the auxiliary power supply 300. For this reason, if the supply voltage of the main power supply 2 differs from the supply voltage of the auxiliary power supply 300, the amount of luminescence (light intensity) of the luminous source 227 changes. For this reason, the amplification factor of the amplifier unit 250 becomes obsolete after the voltage variation, causing the image density to change before and after the power supply change.

Figure 13:
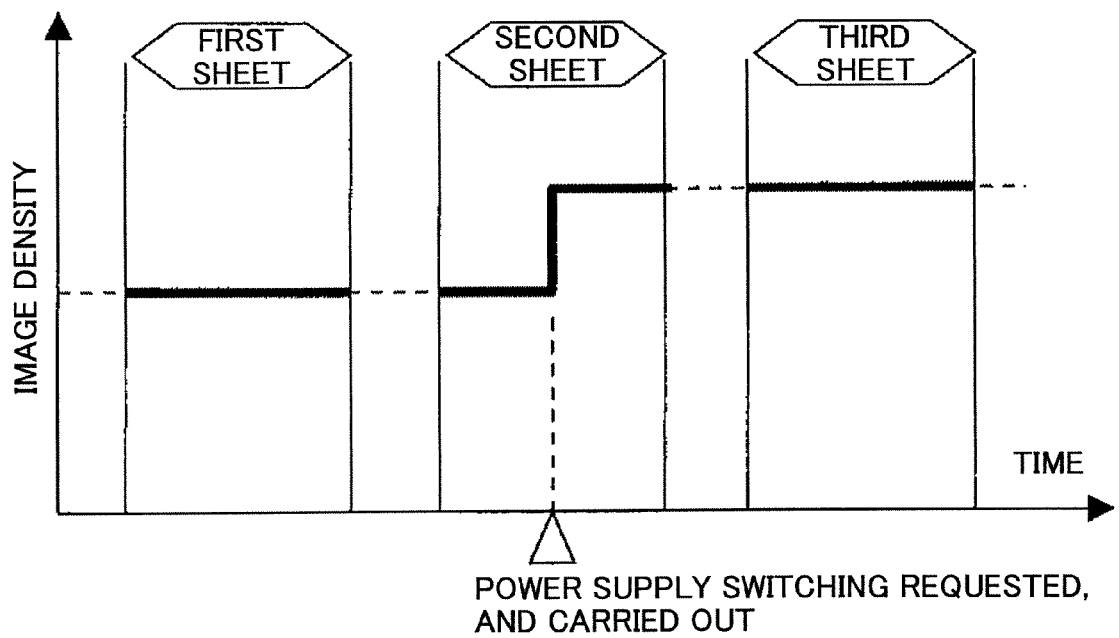
FIG. 13 is a schematic drawing showing a typical image density fluctuation caused by switching the power supply.

Typical image density fluctuation is shown in FIG. 13, wherein the horizontal axis represents a time after starting reading the manuscript G, and is equivalent to the position of the image. The vertical axis represents the image density when outputting a manuscript of a uniform image. With reference to FIG. 13, the power supply switching is requested and the power supply is almost immediately switched while the second sheet of the manuscript is being read; and the intensity of the light of the luminous source 227 becomes different causing the density difference to occur between the first part and the last part of the second sheet image.

Figure 14:
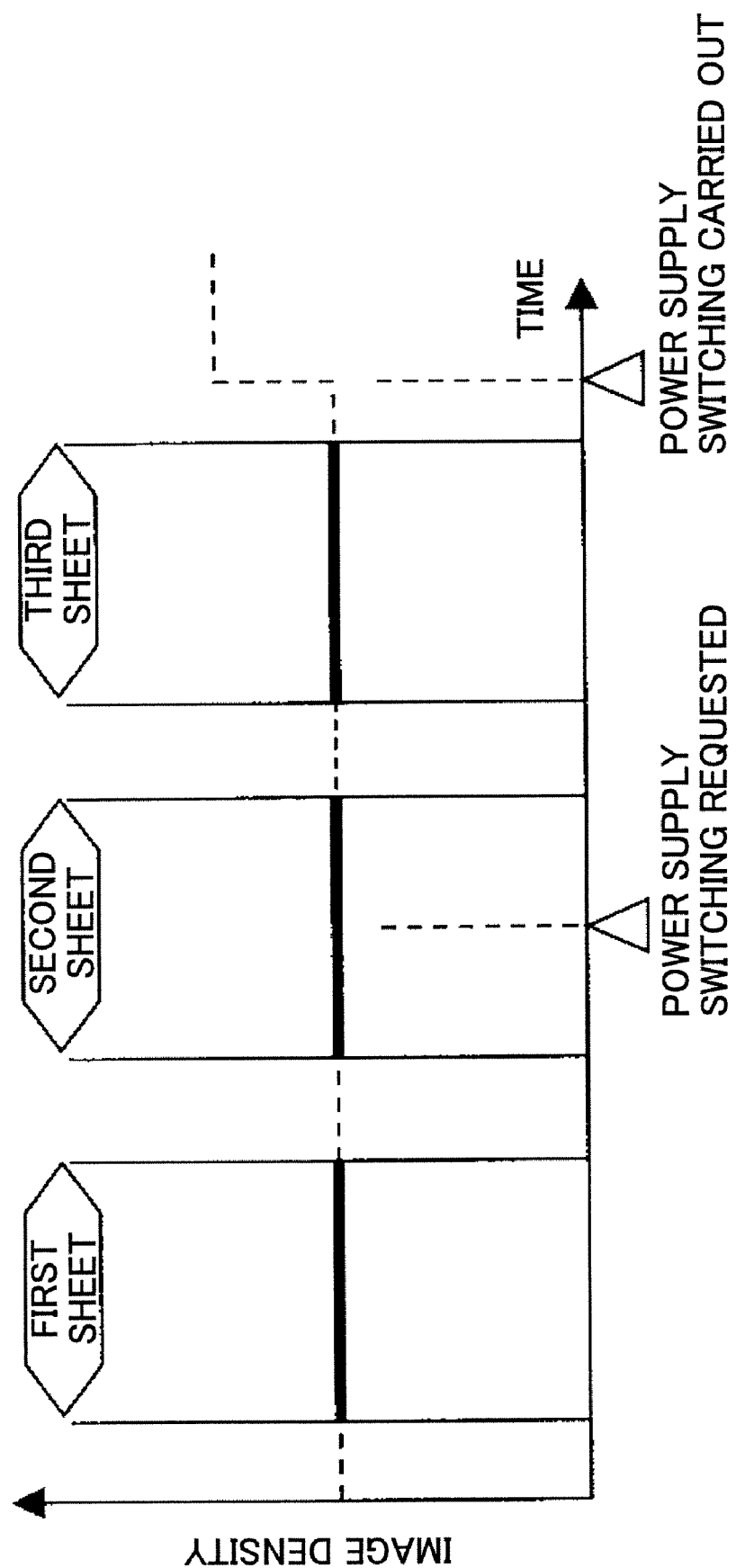
FIG. 14 is a schematic drawing showing a typical image density fluctuation in the case where switching of the power supply is postponed.

Then, the power supply switching is arranged to take place "not during" the reading operation of the sheet as shown in FIG. 14. In this way, density fluctuation does not occur within the sheet. For example, when two or more copies of the same manuscript are to be printed, even if power supply switching from the auxiliary power supply 300 to the main power supply 2 is requested, the actual power supply switching operation is delayed until all the copies are made. In this way, the image density is maintained constant throughout producing the number of copies. This is effective especially when the number of copies is not too great.

Figure 15:
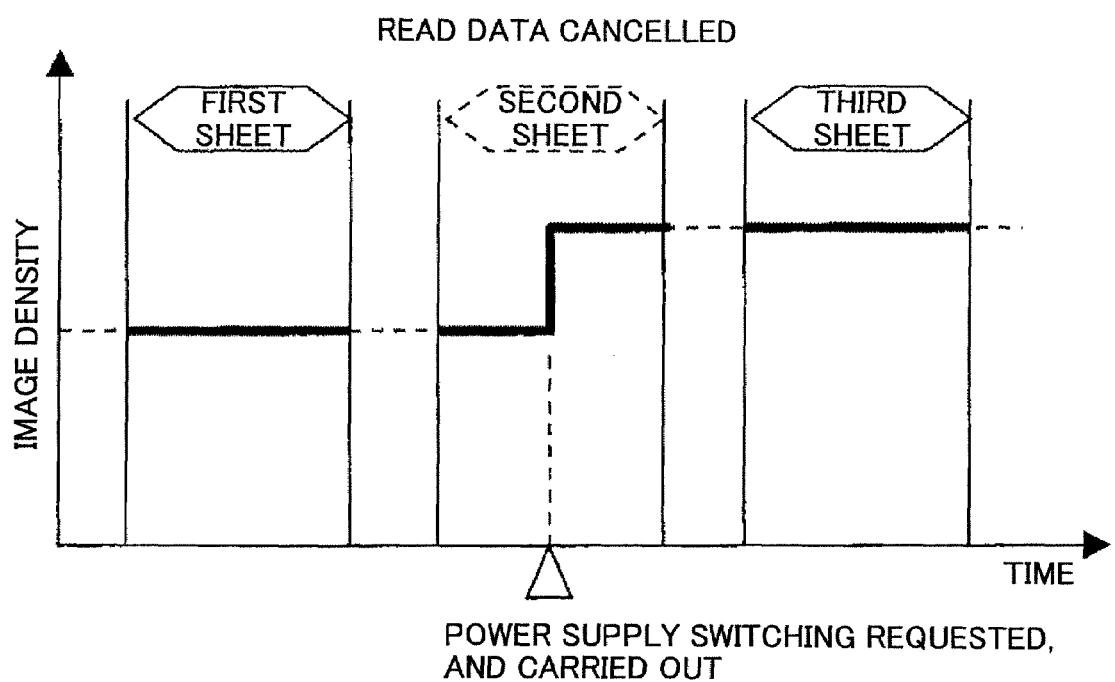
FIG. 15 is a schematic drawing showing a typical image density fluctuation in the case wherein reading is once suspended, the power supply is switched, and reading is restarted.

FIG. 15 shows the case wherein the power supply is switched from the auxiliary power supply 300 to the main power supply 2 almost immediately after the request for switching, and wherein image data reading is suspended, or alternatively, image data acquired so far are cancelled and the reading operation is started anew after the power supply switching, i.e., the whole area of the second sheet is read again. In this way, an image with uniform density can be obtained.

Since the storage battery 3 can stop discharging at a predetermined amount of the remaining power, over-discharging is prevented from occurring. Over-discharging must be prevented from occurring for the storage battery 3. For example, in the case of the electrical-double-layer capacitors that are connected in series, where capacity variations are great, if over-discharging takes place, an electrical-double-layer capacitor may fall even to a reverse potential. Further, a lithium ion battery and a NI—MH battery can be damaged if over-discharging takes place too much, which greatly reduces the service life. However, according to the embodiment, even with the auxiliary power supply 300 capable of providing low power, the manuscript that includes a great number of sheets can be processed.

Figure 16:
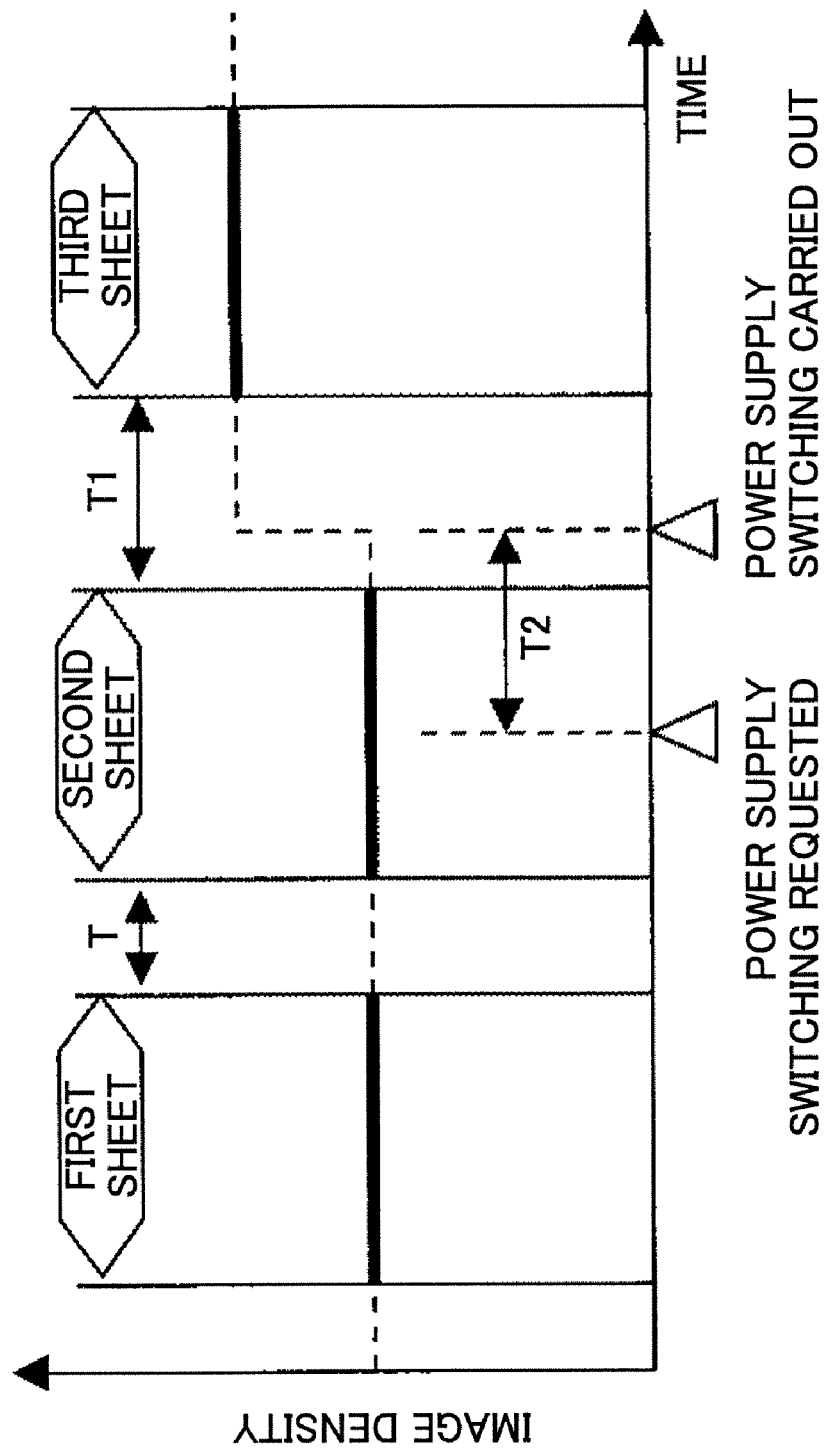
FIG. 16 is a schematic drawing showing a typical image density fluctuation in the case wherein switching of the power supply is carried out at an interval in manuscript reading.

FIG. 16 shows the case wherein the power supply switching is performed with a delay, e.g., by a period T2 from when the request for switching is issued. That is, actual switching of the power supply takes place during a period T1 after having read the second sheet and before reading the third sheet. The period T1 is desired to be longer than a normal period T so that the amount of the light after power supply switching is stabilized. This case is advantageous in that productivity does not fall due to interrupting manuscript reading. Further, even if a line reader is used, wherein manuscript handling such as re-reading of the same manuscript with a manuscript feed device is difficult, the density fluctuation within an image is prevented from occurring.

Figure 17:
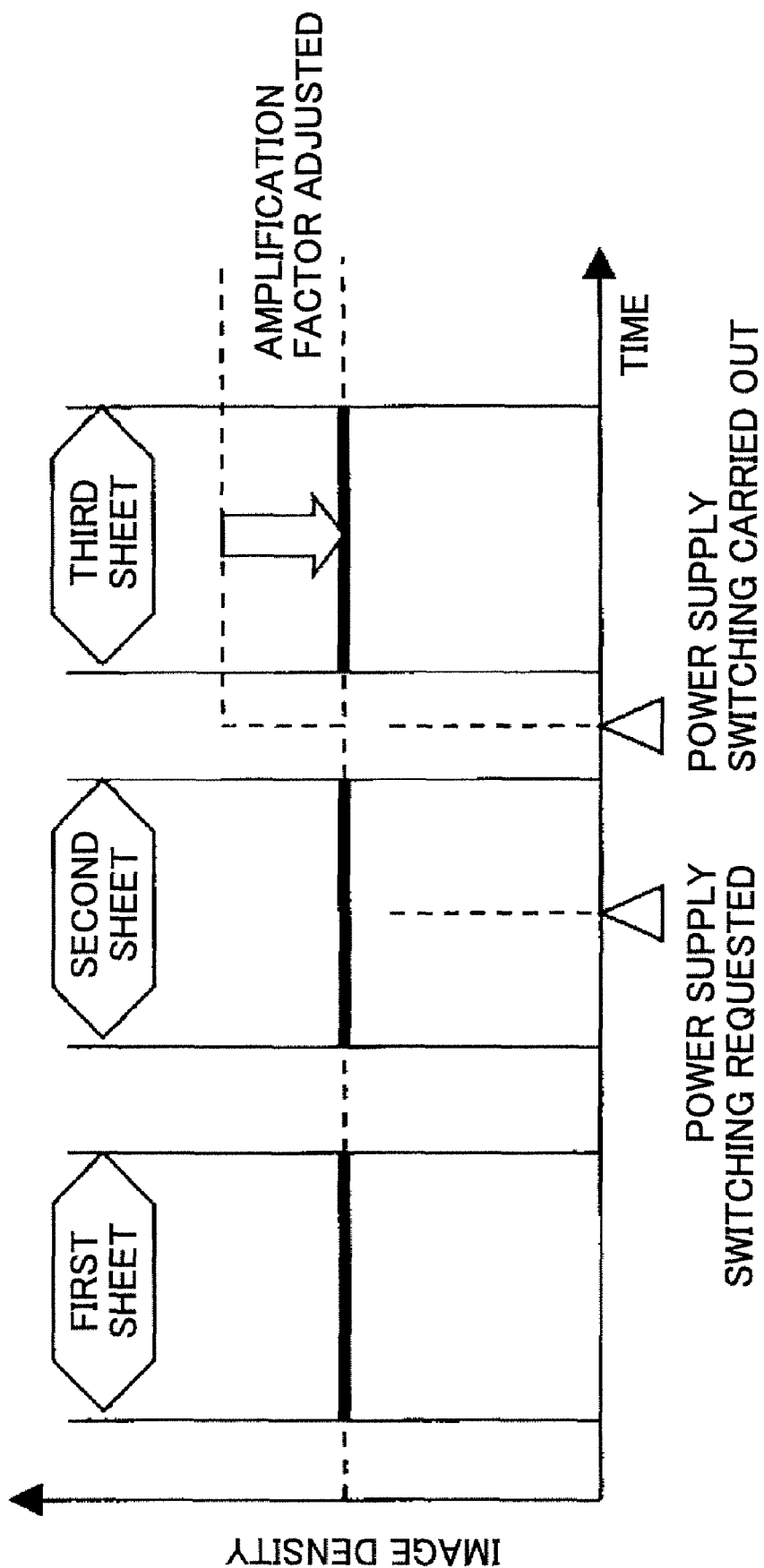
FIG. 17 is a schematic drawing showing typical control of an amplification factor applied to data that are read after the power supply is switched.
Figure 18:
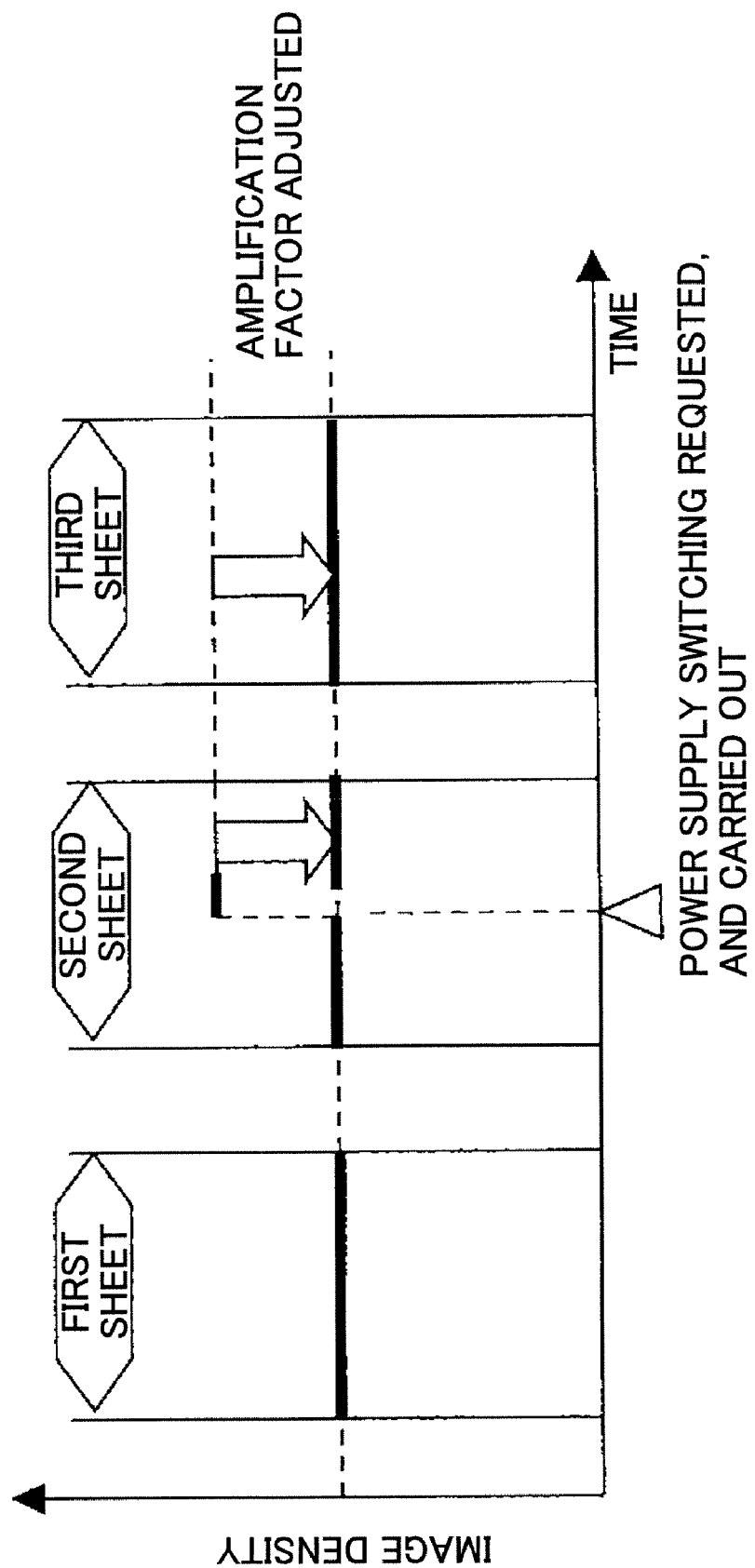
FIG. 18 is a schematic drawing showing typical control of the amplification factor applied to data that are read, wherein the amplification factor is changed when the power supply is switched.

FIG. 17 shows the case wherein the density fluctuation of an image is reduced by changing the amplification factor that is applied to data that are read after power supply switching. Here, the power supply switching is performed when reading is not performed, e.g., between the second and the third sheets. FIG. 18 shows the case wherein the amplification factor is adjusted and the power supply is switched while reading, as soon as the request for power supply switching is made. Here, since there is a time lag for changing the amplification factor, a density fluctuation remains.

For this reason, power supply switching and the amplification factor change are desired to take place when the manuscript reading operation is not carried out as shown in FIG. 17. Here, the value of the amplification factor may be obtained by performing an amplification factor adjustment operation after switching the power supply. Alternatively, the value may be beforehand stored based on an amplification factor applicable to the main power supply 2 and an amplification factor applicable to the auxiliary power supply 300; and the stored value is used. In this way, even when there are two or more manuscripts, the density fluctuation of the output image before and after power supply switching is eliminated.

Figure 19:
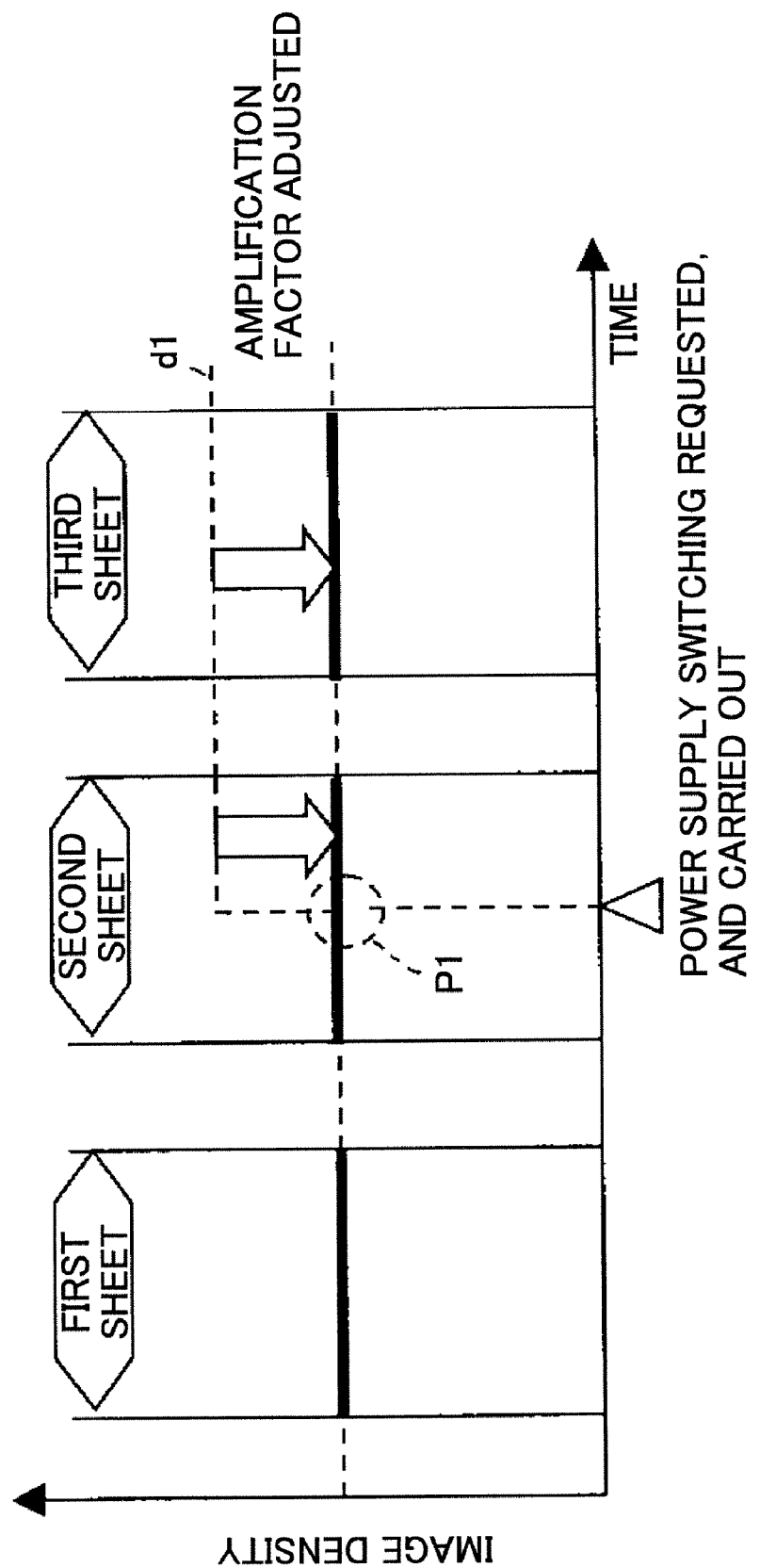
FIG. 19 is a schematic drawing showing typical control of the amplification factor applied to data that are read at the time of switching the power supply according to a position of switching the power supply.

FIG. 19 shows the case wherein the reading operation is continued even if the power supply is switched during the reading operation. Here, data d1 that are read after power supply switching and a position P1 where power supply switching takes place are stored; and the data d1 after the position P1 are compensated for by adjusting the amplification factor.

The data that are acquired by the CCD 226 of FIG. 12 after power supply switching and amplified at the amplification factor applicable to an original power supply are not adequate. Accordingly, the data are accumulated in the image memory unit 255 and a HDD (not illustrated), and the image density of the data is adjusted by, e.g., the image processing unit 259 so that the proper amplification factor is applied to the data. The data stored by the area processing unit 253B, to which data the different amplification factor should be applied, can be specified by the position P1 that represents the time of power supply switching.

Since analog information is not amplified on a real time basis, but the image information that is stored is amplified, a high quality image without the density fluctuation is obtained even if power supply switching takes place while scanning a manuscript.

As described above, the amount of the light from the luminous source 227, such as a lamp, of the image reading optical unit 200, such as a scanner, changes with the output voltage of the power supply. Accordingly, the density of an image changes when the power supply is switched. For example, if the output voltage of the power supply is changed and the amount of the light from the luminous source 227 is changed while scanning a sheet of the printing medium P manuscript, the image is produced with uneven image density due to power supply switching. By not switching the power supply during the image reading operation, there is no fluctuation of the intensity of the light of the luminous source 227; accordingly, a density fluctuation does not occur in the image within a sheet. In this way, a high quality image is obtained with a simple configuration and simple switching control.

Because the power supply is switched after interrupting image reading, there is no fluctuation of the intensity of the light of the luminous source 227 during image reading, and a density fluctuation does not occur in the image within one sheet. Since the storage battery 3 is not discharged below a predetermined voltage and/or longer than a predetermined period, a time required of charging is shortened; and especially as for a rechargeable battery, the service life is prolonged. A great number of sheets of manuscript can be handled with the auxiliary power supply 300 that has a small capacity. Further, since the power supply is switched in the intervals of manuscript reading, a density fluctuation is prevented from occurring in the image within one sheet; and a quality image can be acquired by the simple configuration and simple control.

When there are two or more sheets of the manuscript G, there is a problem in that the amount of luminescence of the luminous source 227 changes before and after switching the power supply, and the density of an output image changes. In this case, the density of the image after switching the power supply can be either greater or less than the image read before switching the power supply. By adjusting the gain (amplification factor) after switching the power supply, even when copying two or more sheets of the manuscript G, a density fluctuation does not occur in the output image due to power supply switching. Accordingly, a quality image can be acquired with the simple configuration and simple control.

Further, the present invention is not limited to these embodiments, but variations and modifications may be made without departing from the scope of the present invention.

The present application is based on Japanese Priority Application No. 2005-3665086 filed on Dec. 19, 2005 with the Japanese Patent Office, the entire contents of which are hereby incorporated by reference.

What is claimed is:

1. An image formation apparatus, comprising:
   a main power supply for supplying electric power to an alternating-current load and a direct-current load;
   an auxiliary power supply for supplying electric power to the direct-current load, which auxiliary power supply is capable of storing electricity; and
   a manuscript reading unit; wherein
   power supply to the direct-current load is switched between the main power supply and the auxiliary power supply when a manuscript reading operation is not being carried out.

2. The image formation apparatus as claimed in claim 1, wherein
   the manuscript reading operation is suspended, power supply to the direct-current load is switched while the manuscript reading operation is suspended, and the manuscript reading operation is resumed after switching the power supply.

3. The image formation apparatus as claimed in claim 1, wherein
   the power supply to the direct-current load is switched during an interval of manuscript reading operations between reading a sheet of the manuscript and reading a next sheet, where the manuscript includes a plurality of the sheets.

4. An image formation apparatus, comprising:
   a main power supply for supplying electric power to an alternating-current load and a direct-current load;
   an auxiliary power supply for supplying electric power to the direct-current load, which auxiliary power supply is capable of storing electricity; and
   a manuscript reading unit; wherein
   power supply to the direct-current load is switched between the main power supply and the auxiliary power supply, and
   an amplification factor of data that are read after switching the power supply is adjusted.

5. The image formation apparatus as claimed in claim 4, wherein
   a value of the amplification factor is a predetermined value stored at the time of power supply switching.

6. The image formation apparatus as claimed in claim 4 wherein,
   a value of the amplification factor is determined by performing an amplification factor adjustment operation at the time of power supply switching.

7. An image formation apparatus, comprising:
   a main power supply for supplying electric power to an alternating-current load and a direct-current load;
   an auxiliary power supply for supplying electric power to the direct-current load, which auxiliary power supply is capable of storing electricity; and
   a manuscript reading unit; wherein
   power supply to the direct-current load is switched between the main power supply and the auxiliary power supply,
   data that are read when the power supply is switched are stored,
   information about a reading position when the power supply is switched is stored, and
   an amplification factor applicable to the stored data is adjusted based on the stored reading position information.

* * * * *